United States Patent
Deruty

(10) Patent No.: US 11,450,339 B2
(45) Date of Patent: Sep. 20, 2022

(54) AUDIO FILE ENVELOPE BASED ON RMS POWER IN SEQUENCES OF SUB-WINDOWS

(71) Applicant: Sony Europe B.V., Surrey (GB)

(72) Inventor: Emmanuel Deruty, Stuttgart (DE)

(73) Assignee: SONY EUROPE B.V., Surrey (GB)

( * ) Notice: Subject to any disclaimer, the term of this patent is extended or adjusted under 35 U.S.C. 154(b) by 191 days.

(21) Appl. No.: 16/648,668

(22) PCT Filed: Oct. 5, 2018

(86) PCT No.: PCT/EP2018/077228
§ 371 (c)(1),
(2) Date: Mar. 19, 2020

(87) PCT Pub. No.: WO2019/068915
PCT Pub. Date: Apr. 11, 2019

(65) Prior Publication Data
US 2020/0265862 A1    Aug. 20, 2020

(30) Foreign Application Priority Data
Oct. 6, 2017 (EP) .................................. 17195346

(51) Int. Cl.
| G10L 19/022 | (2013.01) |
| G10L 25/45 | (2013.01) |
| G10H 1/057 | (2006.01) |
| G10L 21/0356 | (2013.01) |
| G10L 25/51 | (2013.01) |
| G10L 15/05 | (2013.01) |
| G10L 25/78 | (2013.01) |

(52) U.S. Cl.
CPC ............. *G10L 25/45* (2013.01); *G10H 1/057* (2013.01); *G10L 21/0356* (2013.01); *G10L 25/51* (2013.01); *G10H 2250/025* (2013.01); *G10H 2250/261* (2013.01); *G10L 15/05* (2013.01); *G10L 19/022* (2013.01); *G10L 25/78* (2013.01)

(58) Field of Classification Search
CPC ........ G10L 15/05; G10L 25/78; G10L 19/022
See application file for complete search history.

(56) References Cited

U.S. PATENT DOCUMENTS

| 6,618,701 B2 * | 9/2003 | Piket | G10L 25/78 704/226 |
| 7,302,396 B1 * | 11/2007 | Cooke | G11B 27/038 704/500 |
| 8,428,270 B2 * | 4/2013 | Crockett | H03G 1/00 381/98 |

(Continued)

FOREIGN PATENT DOCUMENTS

| EP | 1465192 A1 * | 10/2004 | ............. G11B 27/10 |
| EP | 1465192 A1 | 10/2004 | |
| WO | 2015/035492 A1 | 3/2015 | |

OTHER PUBLICATIONS

D. Ward, et al., "Loudness Algorithms for Automatic Mixing," Proceedings of the 2nd AES Workshop on Intelligent Music Production, London, UK, Sep. 13, 2016. (Year: 2016).*

(Continued)

*Primary Examiner* — Feng-Tzer Tzeng
(74) *Attorney, Agent, or Firm* — Xsensus LLP

(57) ABSTRACT

A method comprising determining an envelope of an audio file based on a double-windowing analysis of the audio file.

13 Claims, 20 Drawing Sheets

(56) References Cited

U.S. PATENT DOCUMENTS

| | | | | |
|---|---|---|---|---|
| 8,452,606 | B2* | 5/2013 | Vos | G10L 19/005 704/500 |
| 9,672,835 | B2* | 6/2017 | Gao | G10L 19/025 |
| 2010/0004932 | A1* | 1/2010 | Washio | G10L 15/05 704/255 |
| 2013/0216053 | A1* | 8/2013 | Disch | H03G 3/00 381/61 |
| 2016/0078875 | A1 | 3/2016 | Helmrich et al. | |

OTHER PUBLICATIONS

D. Ward, et al., "Loudness Algorithms for Automatic Mixing," Proceedings of the 2nd AES Workshop on Intelligent Music Production, London, UK, Sep. 13, 2016 . . . reference available with the 1st Office action. (Year: 2016).*
International Search Report and Written Opinion dated Dec. 19, 2018 for PCT/EP2018/077228 filed on Oct. 5, 2018, 20 pages.
"Acoustics-Normal equal-loudness-level contours," ISO 226, Aug. 15, 2003, 26 pages.
"L2 Ultramaximizer Peak Limiter Plugin | Waves," Retrieved from the Internet URL: http://www.waves.com/plugins/l2-ultramaximizer, on Sep. 15, 2017, 2 pages.
"L2-UltraMaximizer Software audio processor User's Guide," Sep. 2017, 18 pages.
"Phase Correction Plugin—InPhase | Waves," Retrieved from the Internet URL: https://www.waves.com/plugins/inphase, on Oct. 1, 2017, 2 pages.
"Q10—10 Band Paragraphic EQ Plugin | Waves," Retrieved from the Internet URL: https://www.waves.com/plugins/q10-equalizer, on Oct. 5, 2017, 3 pages.
"REAPER | Audio Production Without Limits," Digital Audio Workstation, Retrieved from the Internet URL: http://www.reaper.fm/, on Oct. 4, 2017, 4 pages.
"Waves InPhase User Guide," Jun. 2017, 21 pages.
Aichinger, P., et al., "Describing the transparency of mixdowns: The Masked-to-Unmasked-Ratio," Audio Engineering Society, Convention Paper 8344, Presented at the 130th Convention, London, UK, May 13-16, 2011, pp. 1-10.
Bitzer, J., and Leboeuf, J., "Automatic detection of salient frequencies," Audio Engineering Society, Convention Paper 7704, Presented at the 126th Convention, Munich, Germany, May 7-10, 2009, pp. 1-6.
Dannenberg, R.B., "An Intelligent Multi-Track Audio Editor," In Proceedings of the 2007 International Computer Music Conference, vol. 2, San Francisco, Aug. 2007, pp. 1-7.
Deruty, E., "Goal-Oriented Mixing," Proceedings of the 2nd AES Workshop on Intelligent Music Production, London, UK, Sep. 13, 2016, 2 pages.
Deruty, E., and Tardieu, D., "About Dynamic Processing in Mainstream Music," Journal of the Audio Engineering Society, vol. 62, No. 1/2, Jan./Feb. 2014, pp. 42-55.
Deruty, E., et al., "Human-Made Rock Mixes Feature Tight Relations Between Spectrum and Loudness," Journal of the Audio Engineering Society, vol. 62, No. 10, Oct. 2014, pp. 1-11.
Fletcher, H., and Munson, W.A., "Loudness, Its Definition, Measurement and Calculation," The Journal of the Acoustical Society of America, vol. 5, No. 2, Oct. 1993, pp. 82-108.
Hafezi, S., and Reiss, J.D., "Autonomous Multitrack Equalization Based on Masking Reduction," Journal of the Audio Engineering Society, vol. 63, No. 5, May 2015, pp. 312-323.
John, V., "Multi-Source Room Equalization: Reducing Room Resonances," Audio Engineering Society, Convention Paper 7262, Presented at the 123rd Convention, Oct. 1, 2007, 2 pages (with Abstract only).
Ma, Z., et al., "Intelligent Multitrack Dynamic Range Compression," Journal of the Audio Engineering Society, vol. 63, No. 6, Jun. 2015, pp. 412-426.
Ma, Z., et al., "Partial Loudness In Multitrack Mixing," AES 53rd International Conference, London, UK, Jan. 27-29, 2014, pp. 1-9.
Mansbridge, S., et al., "Implementation and Evaluation of Autonomous Multi-track Fader Control," Audio Engineering Society, Convention Paper 8588, Presented at the 132nd Convention, Budapest, Hungary, Apr. 26-29, 2012, pp. 1-11.
Qmul, "Automatic mixing tools for audio and music production," Center for Digital Music, Retrieved from the Internet URL: http://c4dm.eecs.qmul.ac.uk/automaticmixing/, 1 page.
Ronan, D., et al., "Analysis of the subgrouping practices of professional mix engineers," Audio Engineering Society, Convention Paper, Presented at the 142nd Convention, Berlin, Germany, May 20-23, 2017, pp. 1-13.
Ronan, D., et al., "Automatic Subgrouping of Multitrack Audio," Proc. of the 18th Int. Conference on Digital Audio Effects (DAFx-15), Trondheim, Norway, Nov. 30-Dec. 3, 2015, pp. 1-8.
Stavrou, M., "Mixing with your Mind," 2008, 1 page.
Suzuki, Y., and Takeshima, H., "Equal-loudness-level contours for pure tones," The Journal of the Acoustical Society of America, vol. 116, No. 2, Aug. 2004, pp. 918-933.
Ward, D., and Reiss, J.D., "Loudness Algorithms for Automatic Mixing," Proceedings of the 2nd AES Workshop on Intelligent Music Production, London, UK, Sep. 13, 2016, 2 pages.
Ward, D., et al., "Multi-track mixing using a model of loudness and partial loudness," Audio Engineering Society, Convention Paper 8693, Presented at the 133rd Convention, San Francisco, USA, Oct. 26-29, 2012, pp. 1-9.
"Loudness Normalisation and Permitted Maximum Level of Audio Signals," EBU Operating Eurovision and Euroradio, EBU R 128, Geneva, Jun. 2014, pp. 1-5.

* cited by examiner

AUDIO FILE ENVELOPE BASED ON RMS POWER IN SEQUENCES OF SUB-WINDOWS

CROSS-REFERENCE TO RELATED APPLICATIONS

The present application is based on PCT filing PCT/EP2018/077228, filed Oct. 5, 2018, which claims priority to EP 17195346.6, filed Oct. 6, 2017, the entire contents of each are incorporated herein by reference.

TECHNICAL FIELD

The present disclosure generally pertains to the field of audio processing, e.g. in music and broadcast production, distribution and transmission.

TECHNICAL BACKGROUND

A digital audio workstation (DAW) is an electronic device or software application for recording, editing and producing audio files such as musical pieces, speech or sound effects. DAWs typically provide a user interface that allows the user to record, edit and mix multiple recordings and tracks into a final produced piece.

Music production involves the processes of recording, mixing and mastering. A computer-based DAW typically allows for multitrack recording of audio and provides controls for playing, recording and editing audio tracks.

Modern computer-based DAW support software plug-ins, each having its own functionality, which can expand the sound processing capabilities of the DAW. There exist for example software plug-ins for equalization, limiting, and compression. There also exist software plug-ins which provide audio effects such as reverb and echo. And there exist software plug-ins which provide sound sources to a DAW such as virtual instruments and samplers.

Digital audio processing may involve loudness evaluation, in particular short-term loudness evaluation (=envelope evaluation). The European Broadcasting Union (EBU), see reference [EBU 2011], has studied the needs of audio signal levels in production, distribution and transmission of broadcast programs.

There is a general need for providing better computer-implemented aid to a user in the process of recording, mixing and monitoring.

SUMMARY

According to a first aspect the disclosure provides a method comprising determining an envelope of an audio file based on a double-windowing analysis of the audio file.

According to a further aspect the disclosure provides an electronic device comprising circuitry configured to determine an envelope of an audio file based on a double-windowing analysis of the audio file.

According to a further aspect the disclosure provides a computer program comprising instructions, which when executed on a processor cause the processor to determine an envelope of an audio file based on a double-windowing analysis of the audio file.

Further aspects are set forth in the dependent claims, the following description and the drawings.

BRIEF DESCRIPTION OF THE DRAWINGS

Embodiments are explained by way of example with respect to the accompanying drawings, in which.

DETAILED DESCRIPTION OF EMBODIMENTS

Figure 1:
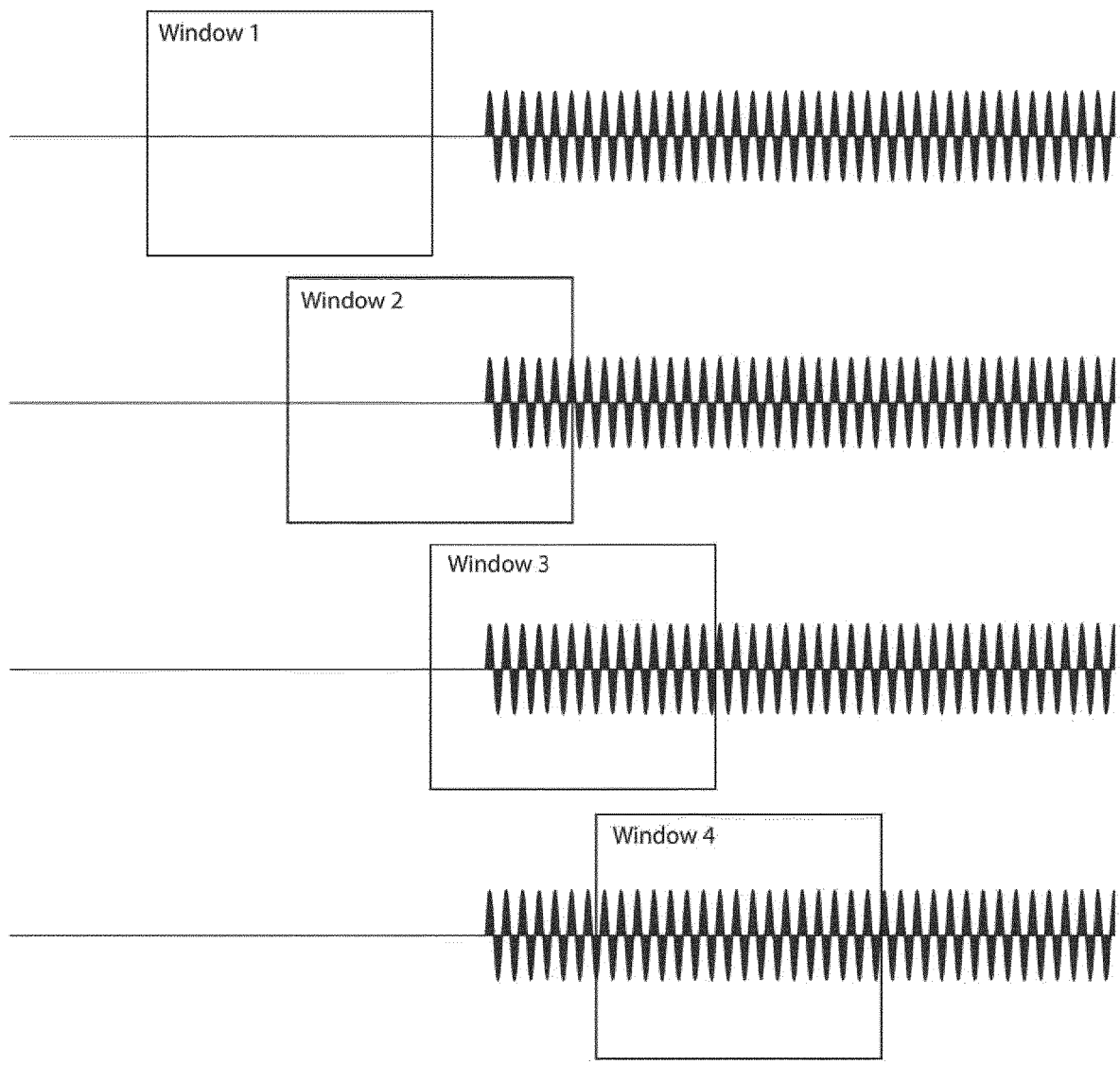
FIG. 1 describes how a sliding window can contain both signal and background noise.

The following embodiments relate to a level and/or loudness evaluation framework, in particular to finding windowed (momentary or short-term) level and/or loudness values from an audio file.

The embodiments disclose a method comprising determining an envelope of an audio file based on a double-windowing analysis of the audio file.

A double-windowing analysis may comprise windowing the audio file to obtain a sequence of windows containing audio, and windowing each window of the sequence of windows to obtain, for each window, a respective sequence of sub-windows.

Windowing each window of the sequence of windows into sub-windows may result into a loudness curve, each value of the loudness curve being obtained from a respective window.

Windowing each window of the sequence of windows into sub-windows may result into a level curve, each value of the level curve being obtained from a respective window.

The methods as described above may for example be integrated into a windowed loudness evaluation of a file.

The methods as described above may for example be integrated into an envelope follower.

The methods as described above may for example be applied in an automatic audio mixing framework.

The methods may be computer-implemented methods. For example, the methods may be implemented as a software application, a digital audio workstation (DAW) software application, or the like. The methods may also be implemented as a software plug-in, e.g. for use in a digital audio workstation software.

The methods may for example be implemented in an electronic device comprising circuitry configured to perform the methods described above and below in more detail. The electronic device may for example be a computer, a desktop computer, a workstation, a digital audio workstation (DAW), or the like. The electronic device may also be a laptop, a tablet computer, a smartphone or the like. Circuitry of the electronic device may include one or more processors, one or more microprocessors, dedicated circuits, logic circuits, a memory (RAM, ROM, or the like), a storage, output means (display, e.g. liquid crystal, (organic) light emitting diode, etc.), loud speaker, an interface (e.g. touch screen, a wireless interface such as Bluetooth, infrared, audio interface, etc.), etc.

Windowed Measurements of Loudness

The European Broadcasting Union (EBU) provides specifications for the windowed loudness of audio content [EBU 2011]. The measure of the windowed loudness, or envelope, includes the windowing of psychoacoustically weighted audio, followed by the evaluation of the root-mean-square (RMS) power of the audio in each window.

The process of evaluating the RMS power of windowed audio can also be performed on unweighted audio, in which case the evaluation is the evaluation of windowed power instead of windowed loudness.

In cases where there exist transitions between low- and high-level audio inside windows, the windowing and evaluation of the RMS power of the audio in each window leads to errors in the estimation of both loudness and power.

FIG. 1 shows a windowing process applied to a sine wave. When the sine wave starts or ends, several windows (e.g. windows 2 and window 3 in FIG. 1) contain both signal and background noise. The measured level for these windows is lower than the measured level for the windows containing only signal (see FIG. 2b).

Figure 2A:
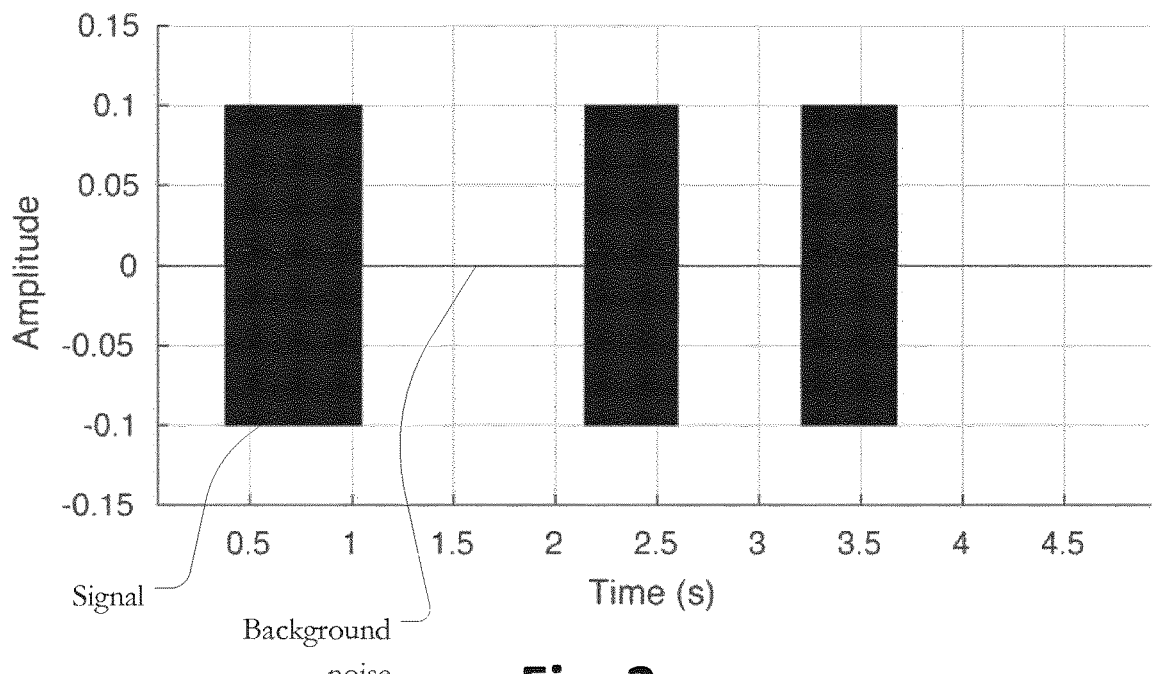
FIG. 2a shows the amplitude of an exemplifying source audio file with transitions between signal and background noise.

FIG. 2a shows the amplitude of an exemplifying source audio file with transitions between signal and background noise. It shows an example track ("Source") in which background noise alternates with a full-scale sine wave.

Figure 2B:
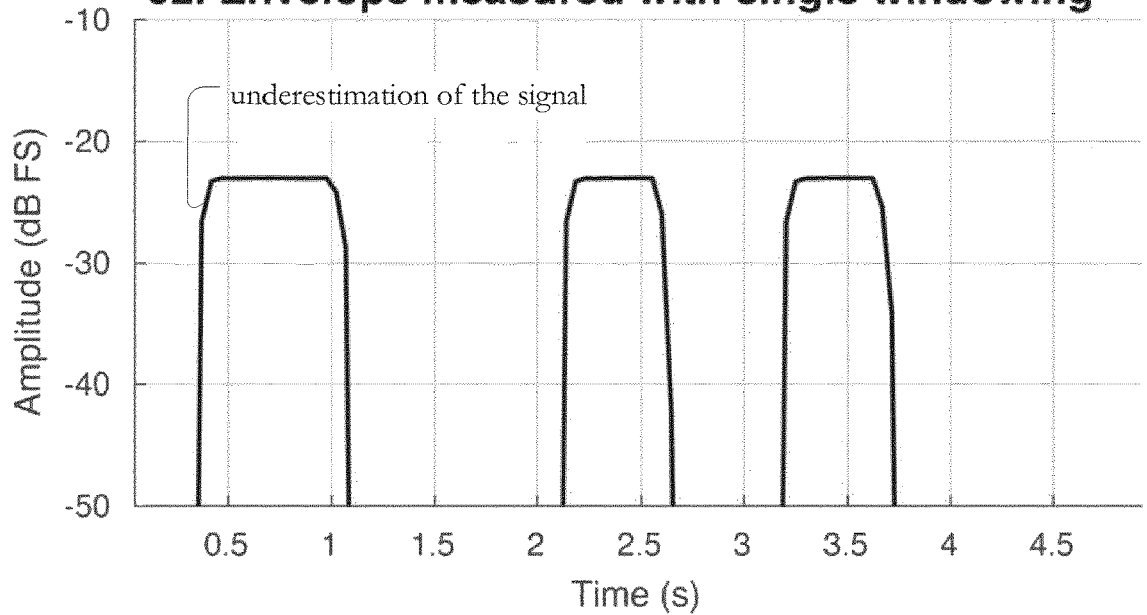
FIG. 2b shows the envelope of source audio file of FIG. 2a as determined with a single windowing approach, which results in that the loudness during transitions is underestimated.

FIG. 2b shows the envelope of source audio file of FIG. 2a as determined with a single windowing approach. The figure shows the result of performing a windowed measurement of level on this example track. The level during transitions is underestimated. Supposing an operation (such as an envelope follower) aiming at setting the example track to a constant target loudness, the lower loudness values mentioned above will result in a locally higher gain, and therefore in artifacts in the form of higher signal level during transitions (see FIG. 11b and corresponding description below).

Using shorter windows will result in the attenuation of the aforementioned artifacts. However, [EBU 2011] specifies window lengths. Particular measures such as "momentary loudness" and "short-term loudness" are performed with fixed window lengths.

The Double-Windowing Process

The process of determining the envelope of input audio using double-windowing as described below in more detail uses the following method to attenuate the artifacts while not changing the window length.

Figure 3:
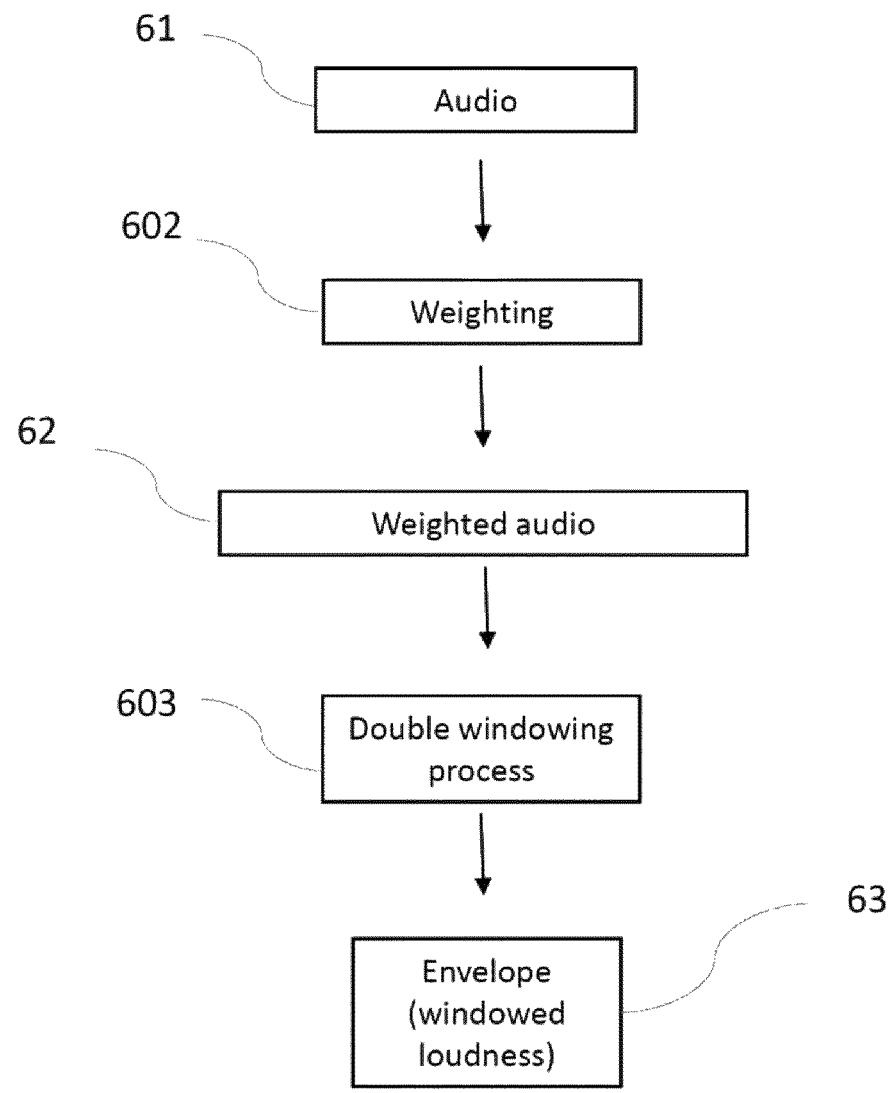
FIG. 3 schematically describes a short-term loudness evaluation process involving double-windowing.

FIG. 3 schematically describes a loudness evaluation process involving double-windowing. At 602, an input audio 61 is psychoacoustically weighted to obtain a weighted audio 62. At 603, the weighted audio 62 is processed using double windowing, to provide the envelope (windowed loudness) 63.

Figure 4:
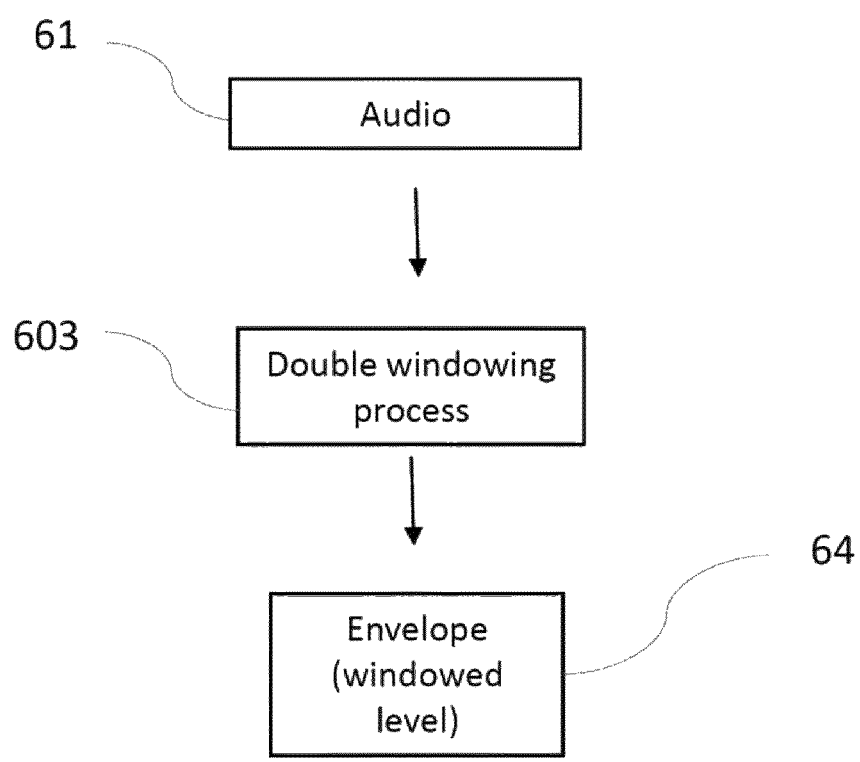
FIG. 4 schematically describes a short-term level evaluation process involving double-windowing (without psycho-acoustically weighting)

FIG. 4 schematically describes a windowed level evaluation process involving double-windowing without psychoacoustically weighting. At 603, the input audio 61 is processed using double-windowing to provide the envelope (windowed level) 64.

In both FIG. 3 and FIG. 4, the double-windowing process may replace the windowing process as described in [EBU 2011] in the evaluation of the envelope (windowed loudness and windowed level).

Figure 5:
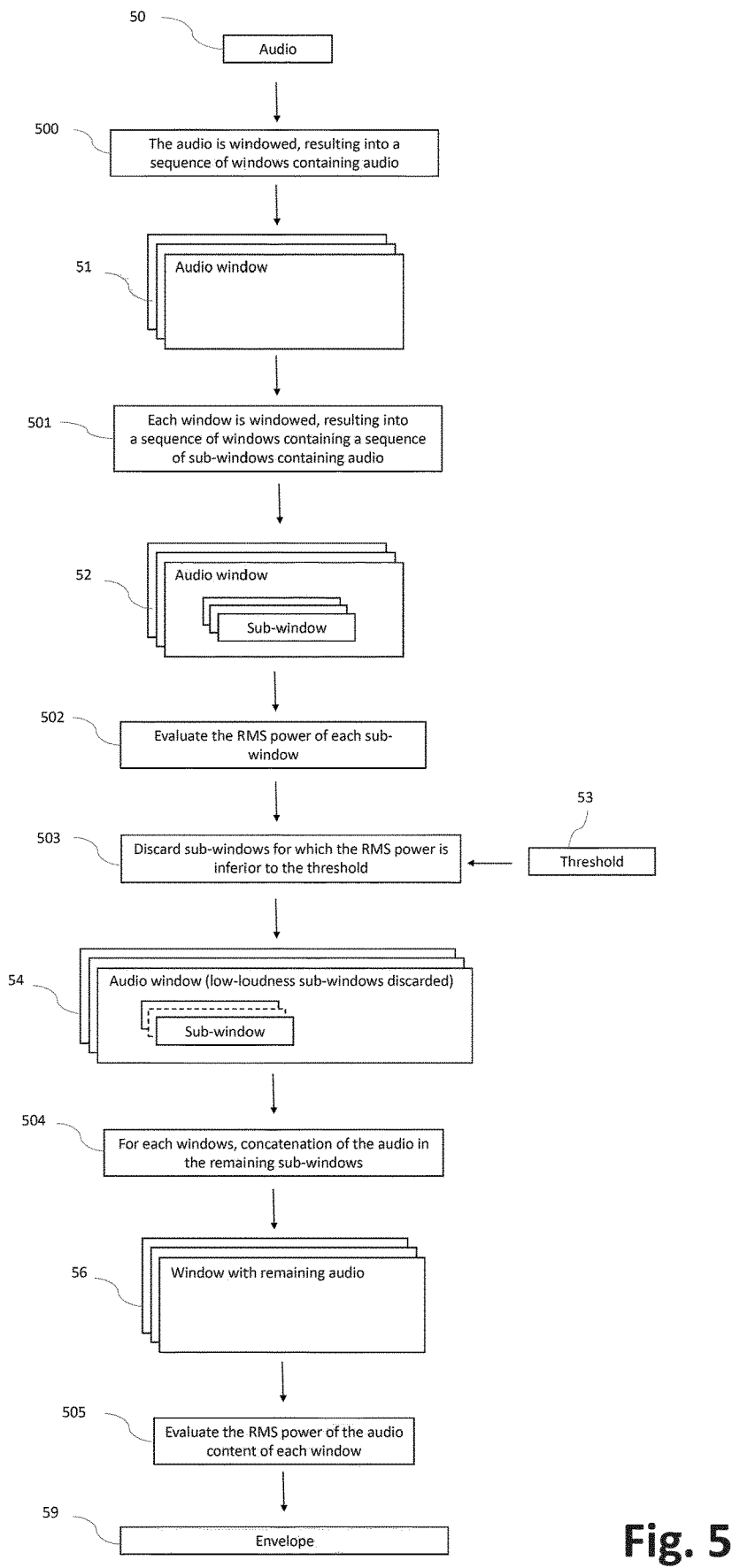
FIG. 5 schematically describes a first possible implementation of the double-windowing process that includes the discarding of low-loudness sub-windows, followed by the concatenation of the remaining audio and the evaluation of the RMS power of the remaining audio.
Figure 7:
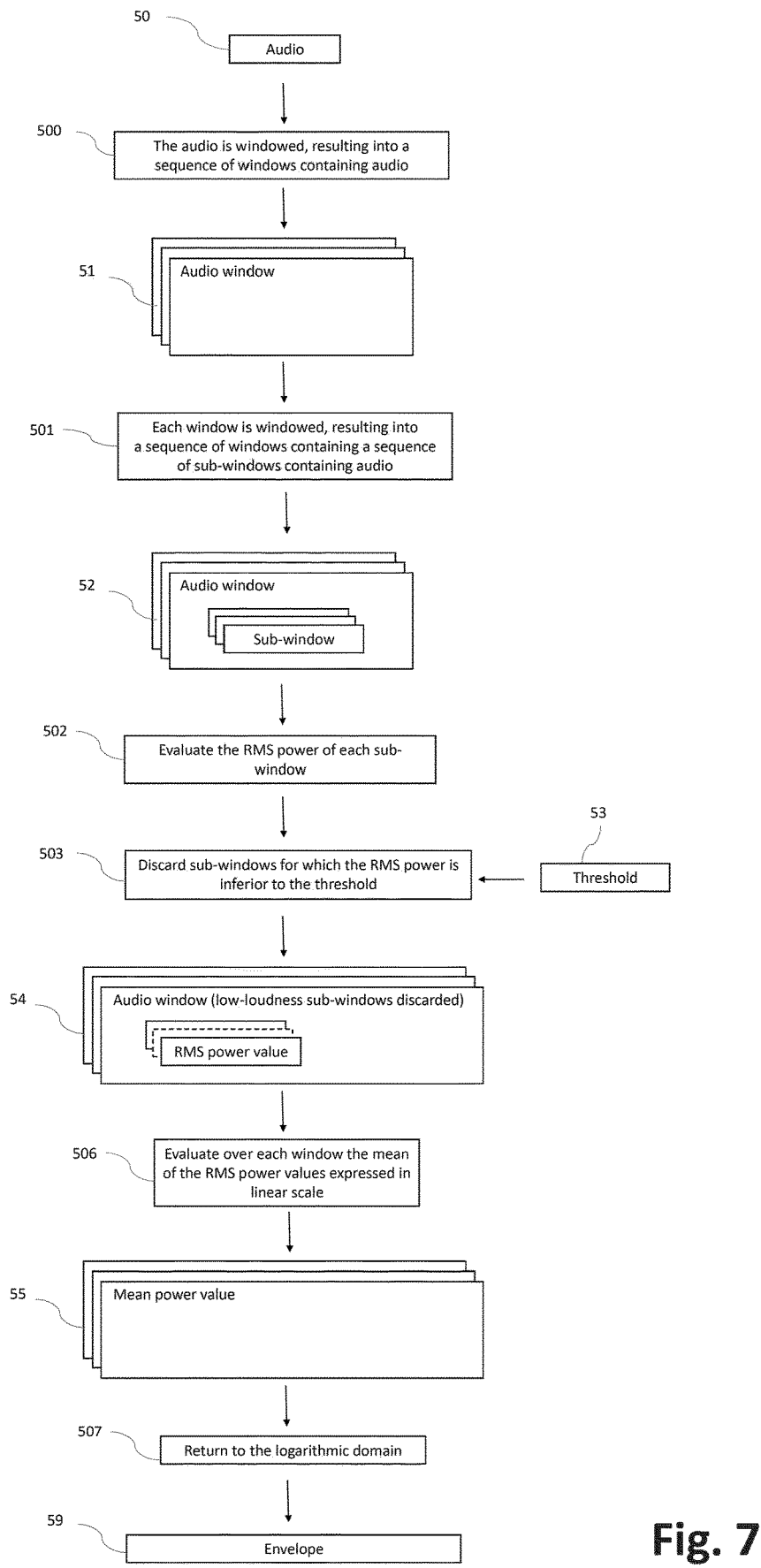
FIG. 7 schematically describes a second possible implementation of the double-windowing process that includes the discarding of low-loudness sub-windows, followed by the evaluation of the mean RMS power of remaining sub-windows.
Figure 9:
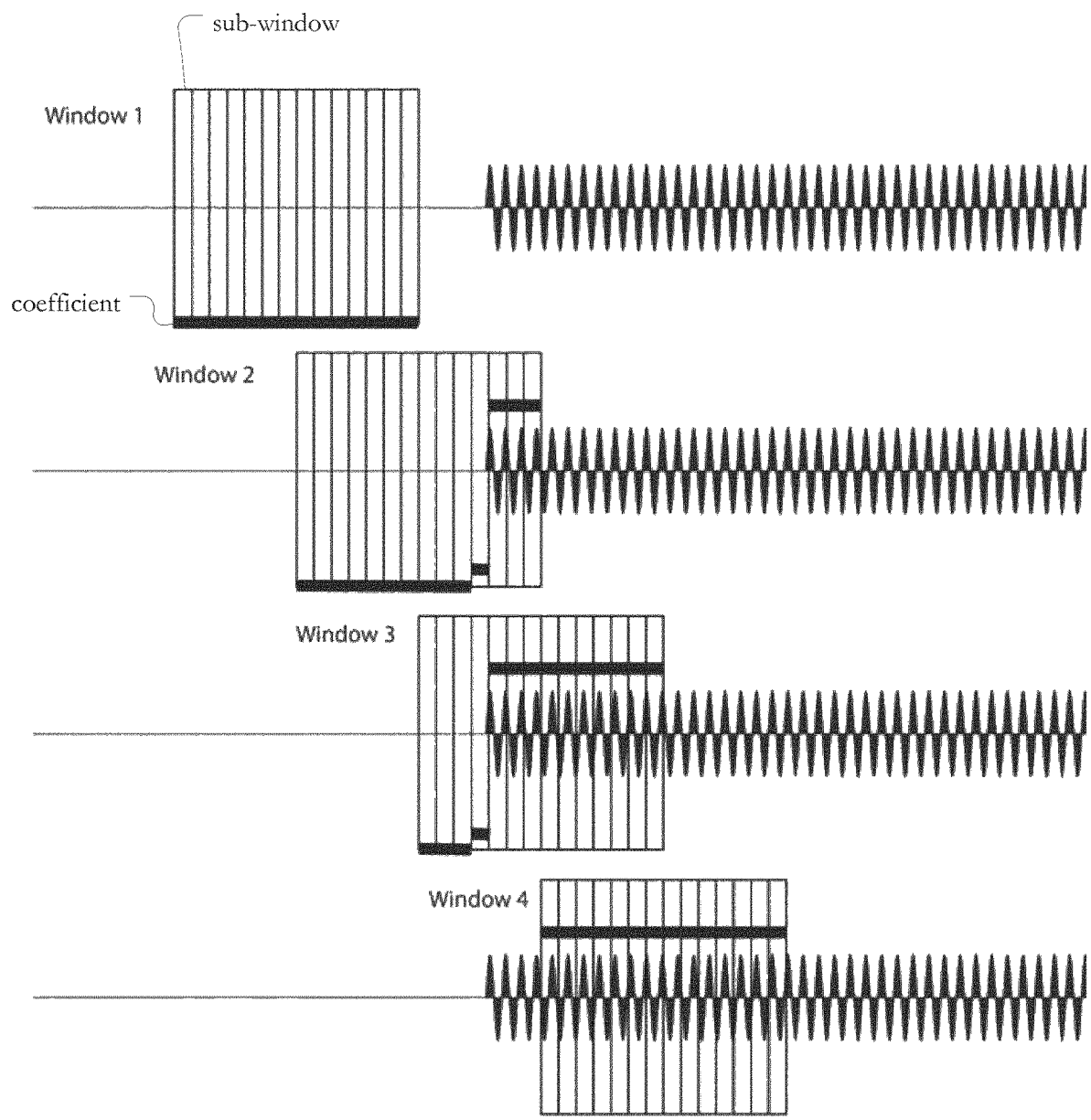
FIG. 9 illustrates the implementation of FIG. 8 on a sequence in which a full-scale sine wave follows background noise.

FIGS. 5, 7 and 9 schematically describe three implementations of a double-windowing process to evaluate the envelope (windowed level) of input audio.

The signal loudness is measured using a standard window length. Each window's content is itself windowed into sub-windows. In a first and second possible implementation, the low-level sub-windows are discarded from the evaluation of the envelope. In a third possible implementation, the influence of the low-level sub-windows over the evaluation of loudness is minimized using a weighted mean.

FIG. 5 schematically describes a first possible implementation of the double-windowing process that includes the discarding of low-loudness sub-windows, followed by the concatenation of the remaining audio and the evaluation of the RMS power of the remaining audio.

At 500, an input audio 50 is windowed, resulting into a sequence of windows 51 containing audio.

Let $\vec{A}$ be the input audio.

Let the $n^{th}$ window be written $\vec{W}(n)$.

Let $N_{window}$ be the length of each window. Let $h_{window}$ be the hop size, with $h_{window} < N_{window}$.

Typical values are $N_{window} = 0.1 \times f_s$ samples, and $h_{window} = 0.05 \times f_s$ samples.

The $n^{th}$ window $\vec{W}(n)$ contains the audio samples $\vec{A}[1+((n-1) \times h_{window})]$ to $\vec{A}[N_{window}+((n-1) \times h_{window})]$.

At 501, each weighted window (51) is itself windowed, resulting into a sequence of windows containing sub-windows, the sub-windows containing audio.

Let $\omega(n, \iota)$ be the $\iota^{th}$ subwindow of the $n^{th}$ window.

Let $N_{sub}$ be the length of each sub-window. Let $h_{sub}$ be the hop size, with $h_{sub} < N_{sub}$.

Typical values are $N_{sub} = N_{window}/16$ and $h_{sub}$ is $0.5 \times vN_{sub}$.

The $\iota^{th}$ sub-window $\omega(n, \iota)$ contains the values $\vec{A}[1+((n-1) \times h_{window})+1+((\iota-1) \times h_{sub})]$ to $\vec{A}[N_{window}+((n-1) \times h_{window})+N_{sub}+((\iota-1) \times h_{sub})]]$.

At 502, the RMS power of the content of each sub-window is evaluated.

At 503, the sub-windows for which the RMS power is inferior to a manually set threshold 53 are discarded, resulting into a sequence 54 of windows containing a subset of the sub-windows in 52. The threshold 53 may be the loudness of the background noise in the signal (see 75 in FIG. 7).

At 504, the sub-windows from each window are concatenated into audio windows 56 that contain only audio from sub-windows whose RMS power is greater than the threshold 53.

Let $\chi[n, \iota]$ be the RMS power of the sub-window $\omega(n, \iota)$.

A window $\vec{W}_{partial}(n)$ is defined as the concatenation of the sub-windows $\omega(n, \iota)$ for which the RMS power $\chi[n, \iota]$ is greater than a threshold T.

At 505, the RMS power over the audio in each window 56 is evaluated, resulting into the envelope 59.

Each element $\vec{L}[n]$ of the envelope $\vec{L}$ is defined as the RMS power of each $\vec{W}_{partial}(n)$.

Figure 6:
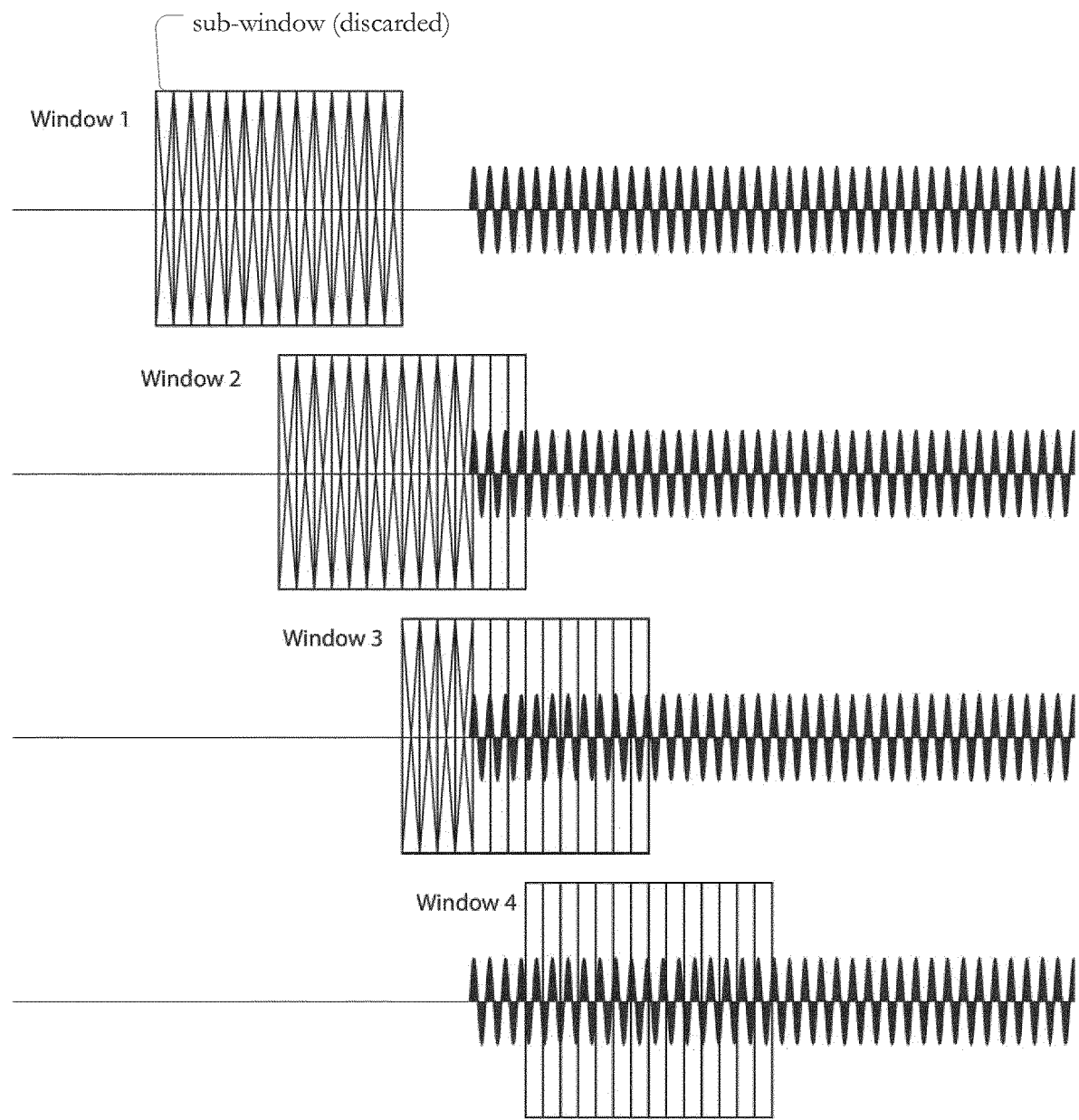
FIG. 6 illustrates the implementation according to FIG. 5 on a sequence in which a full-scale sine wave follows background noise.

FIG. 6 illustrates the above implementation on a sequence in which a full-scale sine wave follows background noise. Each window is split into sub-windows. Sub-windows containing low-level audio are discarded (in FIG. 6 a sub-window that is discarded is crossed-out). Evaluation of the RMS power includes the remaining sub-windows.

FIG. 7 schematically describes a second possible implementation of the double-windowing process that includes the discarding of low-loudness sub-windows, followed by the evaluation of the mean RMS power of remaining sub-windows.

At 500, the input audio 50 is windowed, resulting into a sequence of windows 51 containing audio.

Let $\vec{A}$ be the input audio.

Let the $n^{th}$ window be written $\vec{W}(n)$.

Let $N_{window}$ be the length of each window. Let $h_{window}$ be the hop size, with $h_{window} < N_{window}$.

Typical values are $N_{window} = 0.1 \times f_s$ samples, and $h_{window} = 0.05 \times f_s$ samples.

The $n^{th}$ window $\vec{W}(n)$ contains the audio samples $\vec{A}[1+((n-1) \times h_{window})]$ to $\vec{A}[N_{window}+((n-1) \times h_{window})]$.

At 501, each weighted window 51 is itself windowed, resulting into a sequence of windows containing sub-windows, the sub-windows containing audio.

Let $\omega(n, \iota)$ be the $\iota^{th}$ subwindow of the $n^{th}$ window.

Let $N_{sub}$ be the length of each sub-window. Let $h_{sub}$ be the hop size, with $h_{sub} < N_{sub}$.

Typical values are $N_{sub} = N_{window}/16$ and $h_{sub}$ is $0.5 \times vN_{sub}$.

The $\iota^{th}$ sub-window $\omega(n, \iota)$ contains the values $\vec{A}[1+((n-1) \times h_{window})+1+((\iota-1) \times h_{sub})]$ to $\vec{A}[N_{window}+((n-1) \times h_{window})+N_{sub}+((\iota-1) \times h_{sub})]]$.

At 502, the RMS power of the content of each sub-window is evaluated.

At 503, the sub-windows for which the RMS power is inferior to a manually set threshold 53 are discarded, resulting into a sequence 54 of windows containing a subset of the sub-windows in 52. The threshold may be the loudness of the background noise in the signal.

At 506, the RMS power values are expressed on a linear scale, and for each window, the mean of the RMS power values of the remaining sub-windows are evaluated.

Let $\chi[n, \iota]$ be the RMS power of the sub-window $\omega(n, \iota)$, expressed on a linear scale.

The envelope $\vec{L}[n]$ is evaluated as $\vec{L}[n] = \overline{\chi[n,\iota]}$.

At 507, the envelope is expressed in the logarithmic domain.

At 509, $\vec{L}$ is expressed in the logarithmic domain, with $\vec{L}$ being set to $20 \times \log_{10}(\vec{L})$.

Figure 8:
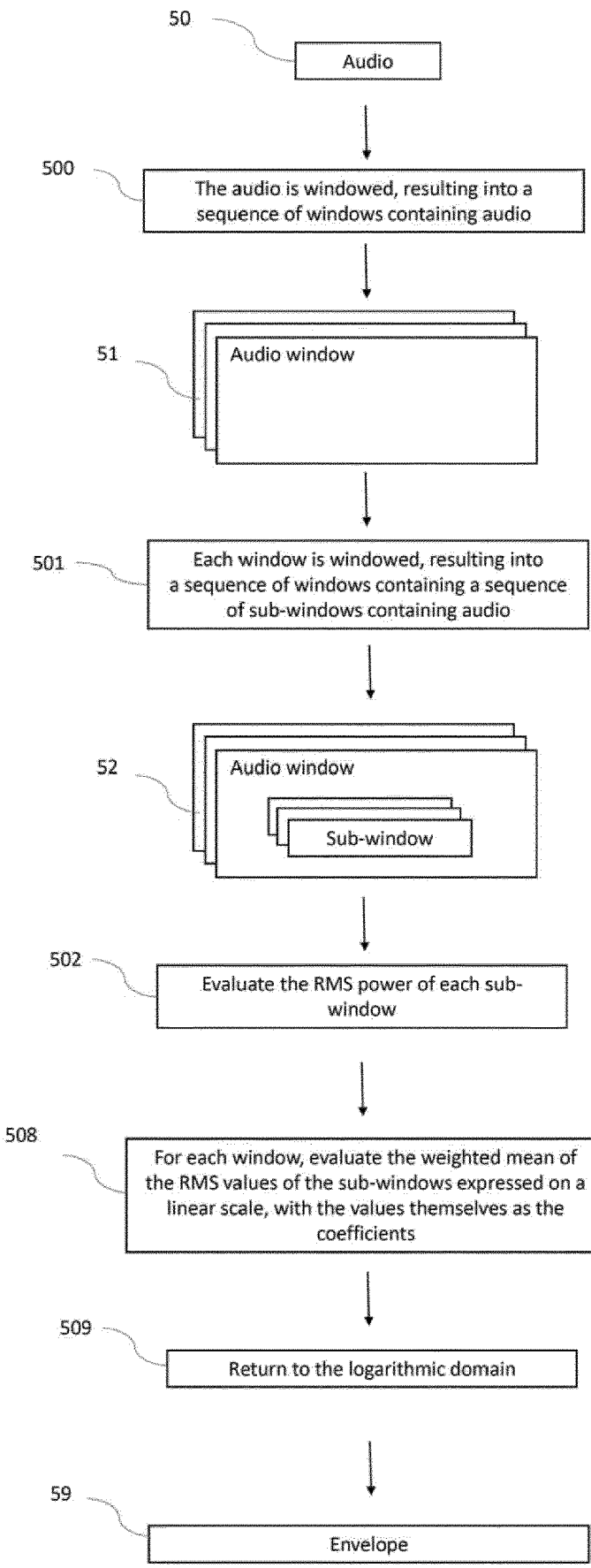
FIG. 8 schematically describes a third possible implementation of the double-windowing process that includes the evaluation of the weighted mean of the loudness of the sub-windows, using the loudness values themselves as the coefficients.

FIG. 8 schematically describes a third possible implementation of the double-windowing process that includes the evaluation of the weighted mean of the loudness of the sub-windows, using the loudness values themselves as the coefficients.

The implementation according to FIG. 8 is similar to that of FIG. 5 where, at 503, the sub-windows for which the RMS power is lower than a threshold are discarded. This is equivalent to attaching a coefficient to each sub-window, the coefficient being zero if the RMS power is lower than a threshold, and one if the RMS power is higher than a threshold. According to the implementation of FIG. 8, however, in the double-windowing process the attached coefficient is not either zero or one but the RMS power of the sub-window expressed on a linear scale.

At 500, the input audio 50 is windowed, resulting into a sequence of windows 51 containing audio.

Let $\vec{A}$ be the input audio.

Let the $n^{th}$ window be written $\vec{W}(n)$.

Let $N_{window}$ be the length of each window. Let $h_{window}$ be the hop size, with $h_{window} < N_{window}$.

Typical values are $N_{window} = 0.1 \times f_s$ samples, and $h_{window} = 0.05 \times f_s$ samples.

The $n^{th}$ window $\vec{W}(n)$ contains the audio samples $\vec{A}[1+((n-1) \times h_{window})]$ to $\vec{A}[N_{window}+((n-1) \times h_{window})]$.

At 501, each weighted window 51 is itself windowed, resulting into a sequence of windows containing sub-windows, the sub-windows containing audio.

Let $\omega(n, \iota)$ be the $\iota^{th}$ sub-window of the $n^{th}$ window.

Let $N_{sub}$ be the length of each sub-window. Let $h_{sub}$ be the hop size, with $h_{sub} < N_{sub}$.

Typical values are $N_{sub} = N_{window}/16$ and $h_{sub}$ is $0.5 \times vN_{sub}$. The $\iota^{th}$ sub-window $\omega(n, \iota)$ contains the values $\vec{A}[1+((n-1) \times h_{window}) + 1 + ((\iota-1) \times h_{sub})]$ to $\vec{A}[N_{window} + ((n-1) \times h_{window}) + N_{sub} + ((\iota-1) \times h_{sub})]]$.

At 502, the RMS power of the content of each sub-window is evaluated.

At 508, each value of the envelope is evaluated as the weighted mean of the RMS values of the sub-windows in the window $\vec{A}(n)$, with the RMS values being themselves the coefficients.

Let $\chi[n, \iota]$ be the RMS power of the sub-window $\omega(n, \iota)$, expressed on a linear scale.

For each n, $\vec{L}[n]$ is set to $$\frac{\sum_{l} \chi[n, l]^2}{\sum_{l} \chi[n, l]}.$$

At 509, $\vec{L}$ is expressed in the logarithmic domain, with $\vec{L}$ being set to $20 \times \log_{10}(\vec{L})$.

FIG. 9 illustrates the above implementation on a sequence in which a full-scale sine wave follows background noise. Each window is split into sub-windows. The coefficients of the weighted mean of the RMS power values of the sub-windows are the RMS power values themselves.

Exemplifying standard window lengths range from 2^14 to 2^17 samples in 44 kHz, divided in 16 sub-windows.

Envelope Follower

An envelope follower is an algorithm that conforms the envelope of an audio file, the source envelope, to a target envelope, possibly of a target audio file, resulting into a new audio file.

Figure 10:
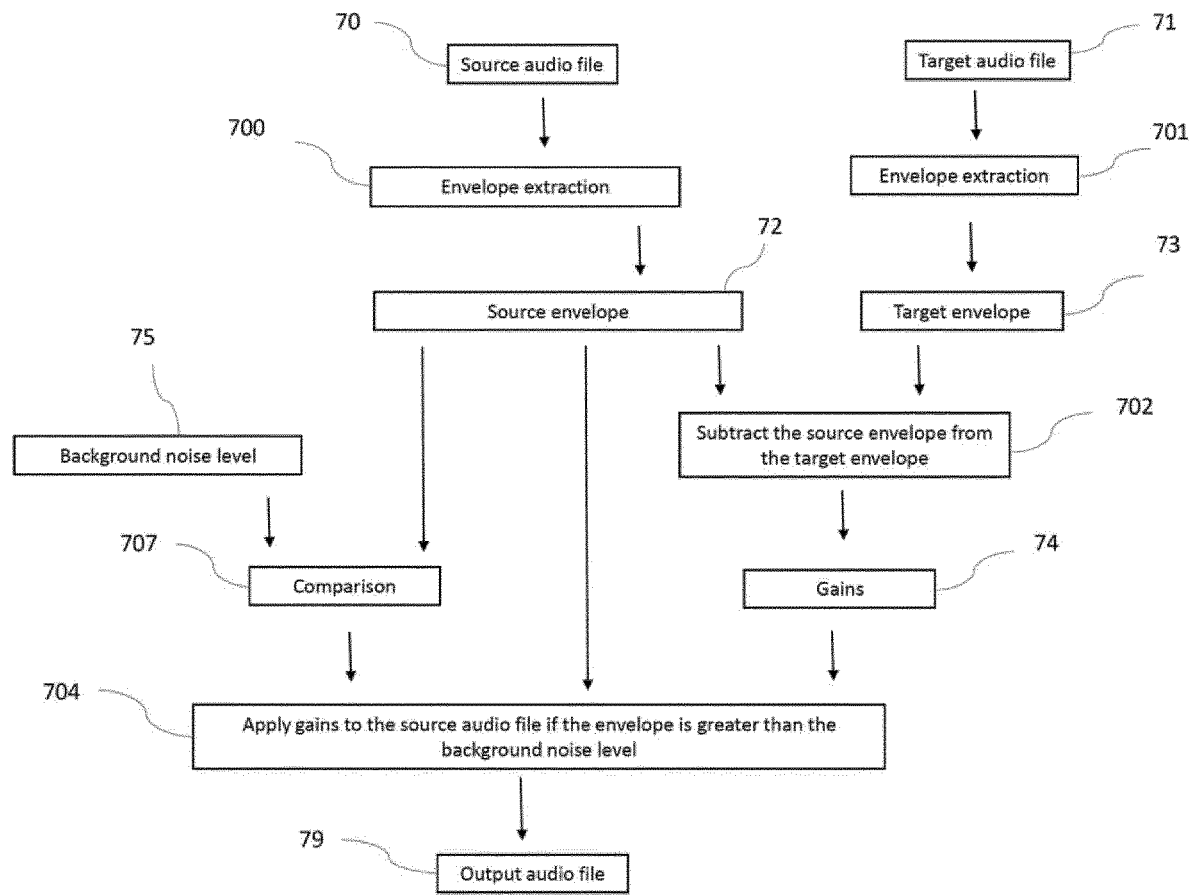
FIG. 10 schematically describes an example application of envelope evaluation of audio files, in the form of an envelope follower.

FIG. 10 schematically represents an envelope follower.

At 700, the envelope (short-term level) is extracted from a source audio file 70, resulting into the envelope of the source 72.

At 701, the envelope (short-term level) is extracted from a source audio file 71, resulting into the envelope of the source 73.

Both envelopes are expressed in a logarithmic scale.

At 702, the source envelope 72 is subtracted from the target envelope 73, resulting into the gains 74 that are to be applied to the source 70 so that its envelope conforms to the target envelope 73.

In practice, as it would result in background noise being as loud as the signal, the gains shouldn't be applied when the source contains background noise only. At 707, the background noise level 75 is compared to the source envelope. At 704, the gains are applied if the source envelope 72 is greater than the background noise level 75.

The correctness of the evaluated envelopes has consequences on the performance of the envelope follower.

Figure 11A:
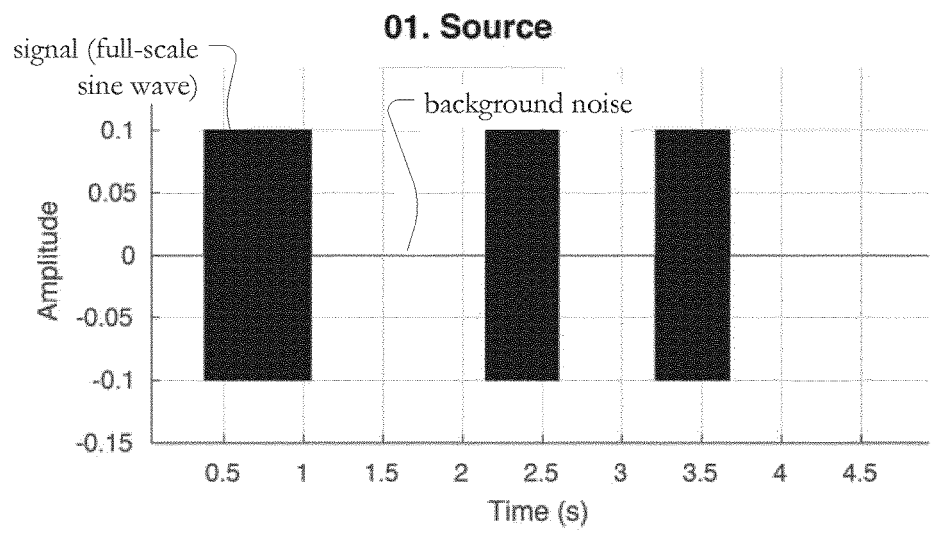
FIGS. 11a-c show how the double-windowing process reduces the higher loudness in processed audio during transitions.
Figure 11B:
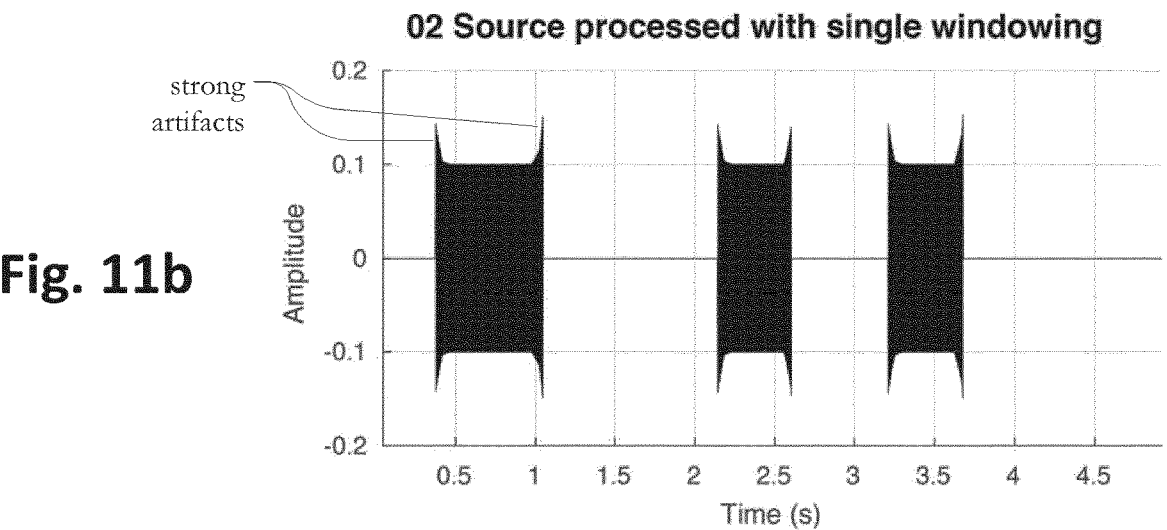
Figure 11C:
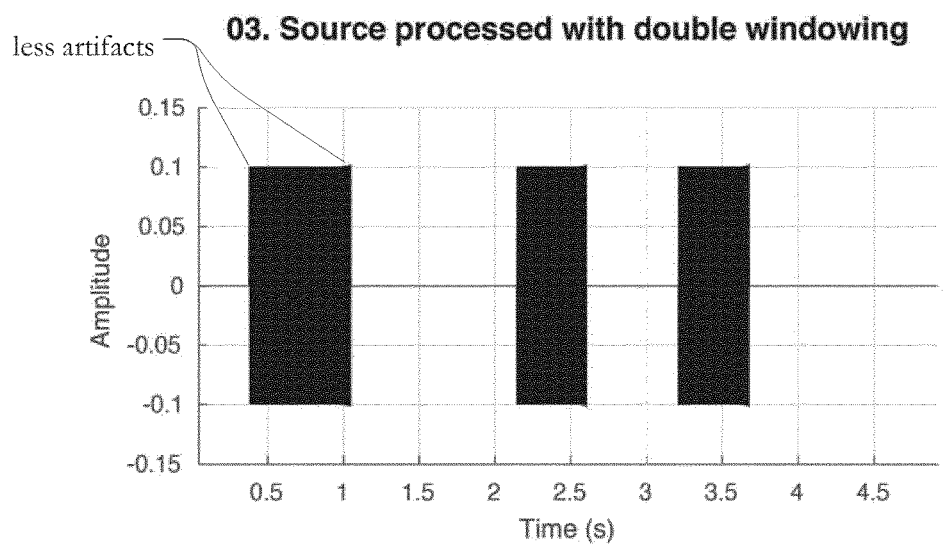

FIGS. 11*a-c* show results of performing windowed measurements of level on an example track with an envelope follower. FIG. 11*a* shows an example track ("Source") in which background noise alternates with a full-scale sine wave. FIGS. 11*b* and 11*c* show the results of performing a windowed measurement of level on this example track. FIG. 11*b* corresponds to the resulting levels when the source is processed with single windowing. FIG. 11*c* corresponds to the resulting levels when the source is processed with double windowing. Supposing an envelope follower aiming at setting the example track to a constant target level, the replacement of a windowing process by a double-windowing process during envelope evaluation will result in smaller artifacts during the transitions between the background noise and the full-scale sine wave (FIGS. 11*b* and 11*c*).

Mixing Multiple Tracks

Figure 12:
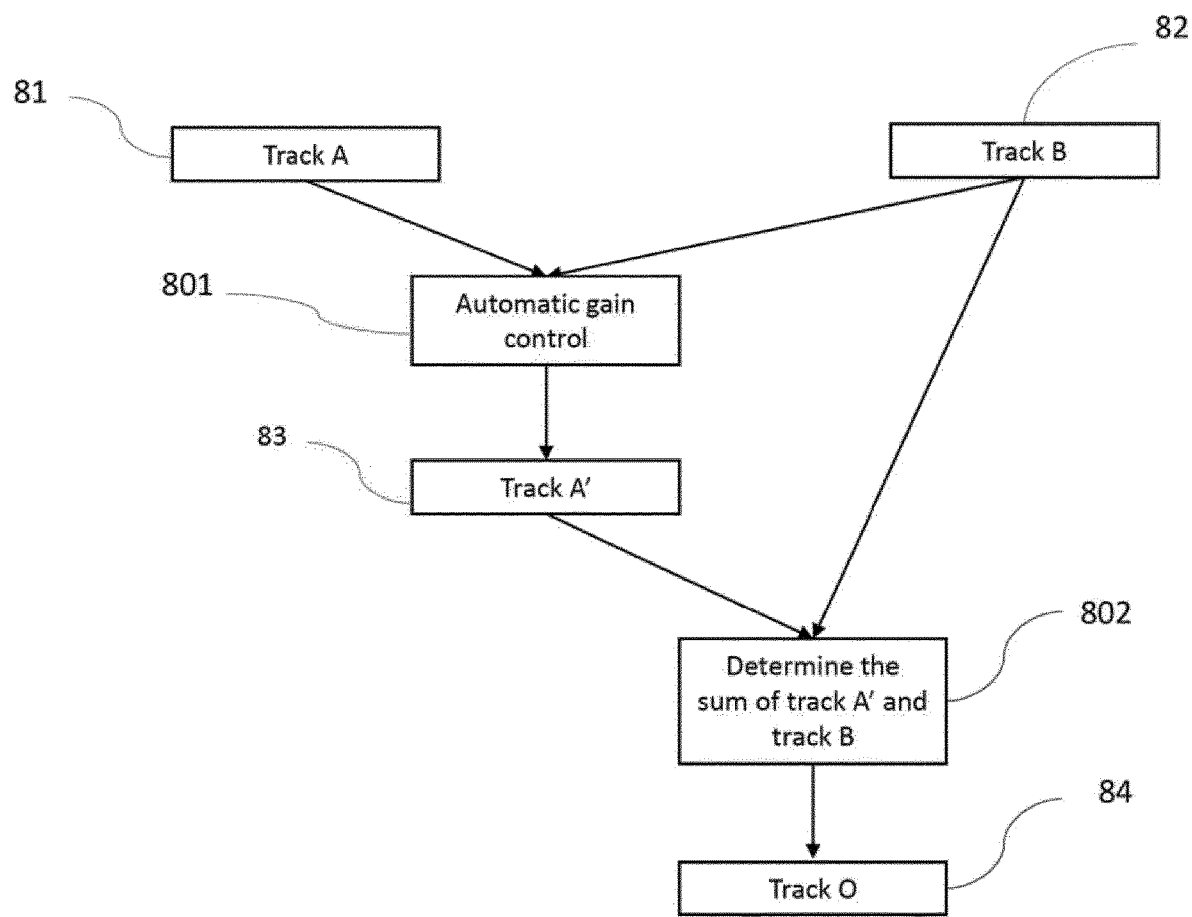
FIG. 12 schematically describes an example application of envelope evaluation of audio files, in the form of the summing of two tracks of equal level.

FIG. 12 schematically describes a process of mixing two audio files set at the same level using the envelope conformation process described in FIG. 10 above.

According to the example of FIG. 12, a project contains two audio tracks, track A 81 and track B 82. At 801, the process of envelope conformation described in FIG. 10 above is applied to tracks A and B. In this process, track A is used as the source audio file 70 and track B is used as the target audio file 71. Gains 74 are determined from track A and track B as described with regard to the process of FIG. 11. The obtained gains G are applied to the track A 81 which acts as source audio file 70 as described with regard to FIG. 10 to obtain track A' 83 as resulting audio file 79.

Then, at 802, the sum of track A' and track B is determined in a conventional way to obtain output track O.

If a project contains multiple tracks, then the above described process can be iteratively applied to some or all of the audio tracks of the project so as to balance the level of the tracks in an automated way. If for example a project contains three tracks, track A, track B and track C, then in a first step the loudness of track A can be adapted to the loudness of track B to obtain a modified version of track A, denoted track A', and track A' and track B can be summed in a conventional way to obtain a track O as described with regard to FIG. 12 above. Then, in a second step, the loudness of track O can be adapted to the loudness of track C using the same processes described above to obtain a track O' and track O' and track C can be summed in a conventional way to obtain a track M as the result of the mixing process (main channel output). Projects with more than three tracks can be processed in an analogue way.

Anchor Time

Figure 13:
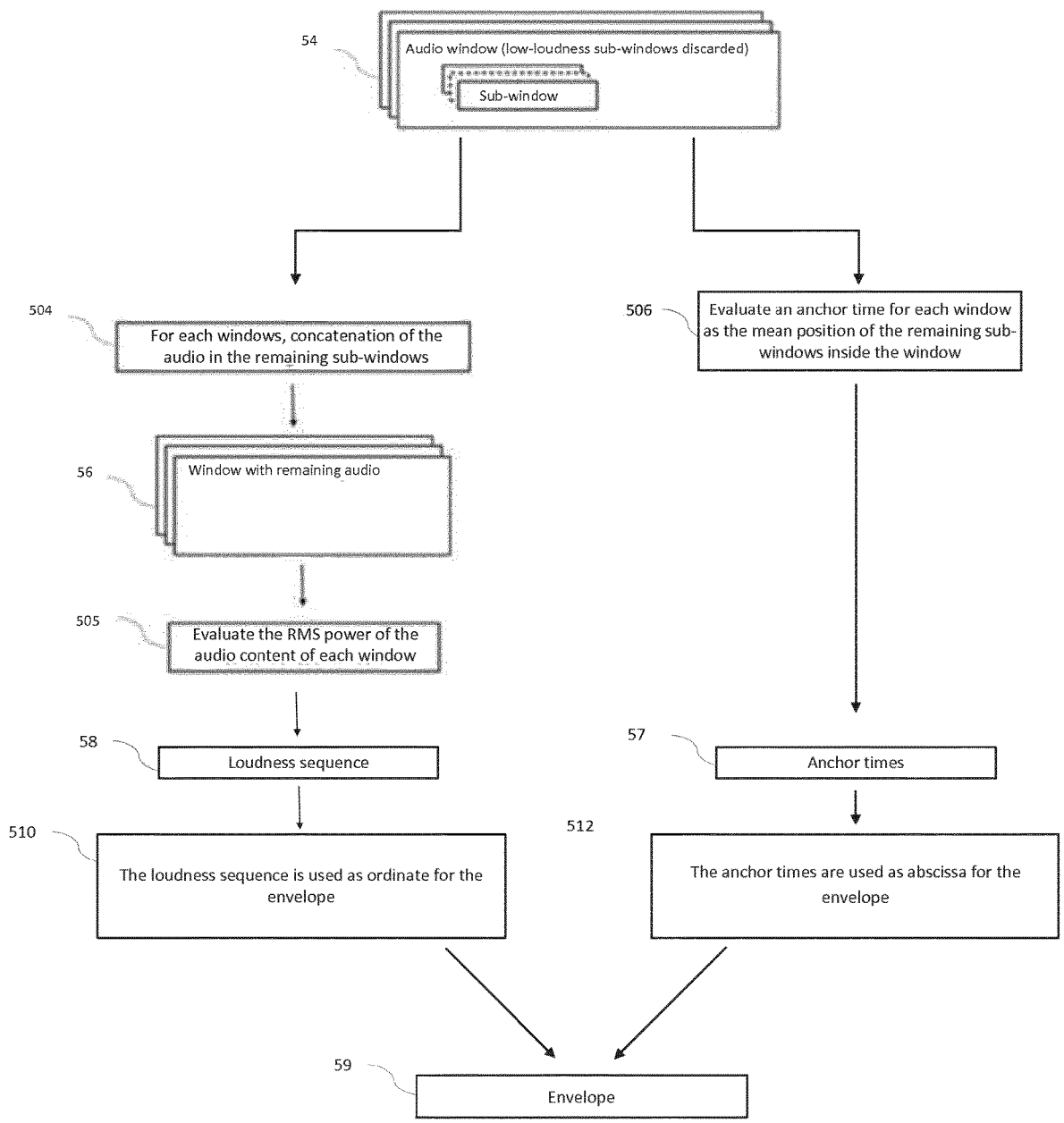
FIG. 13 schematically describes an implementation of the double-windowing process that includes the discarding of low-loudness sub-windows, followed by the concatenation of the remaining audio and the evaluation of the RMS power of the remaining audio and an evaluation of anchor times.
Figure 15:
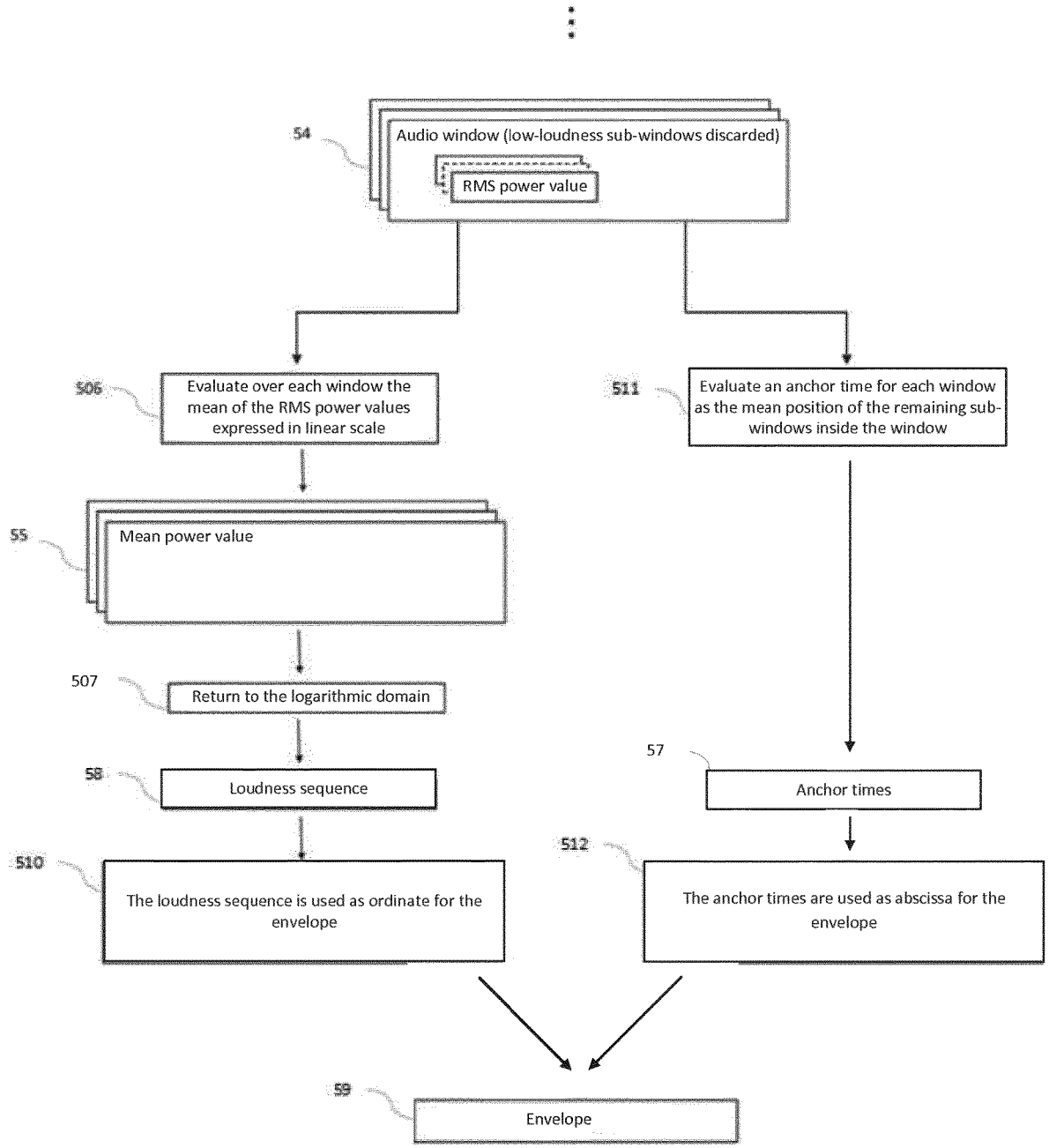
FIG. 15 schematically describes an implementation of the double-windowing process that includes the discarding of low-loudness sub-windows, followed by the evaluation of the mean RMS power of remaining sub-windows, and an evaluation of anchor times.
Figure 16:
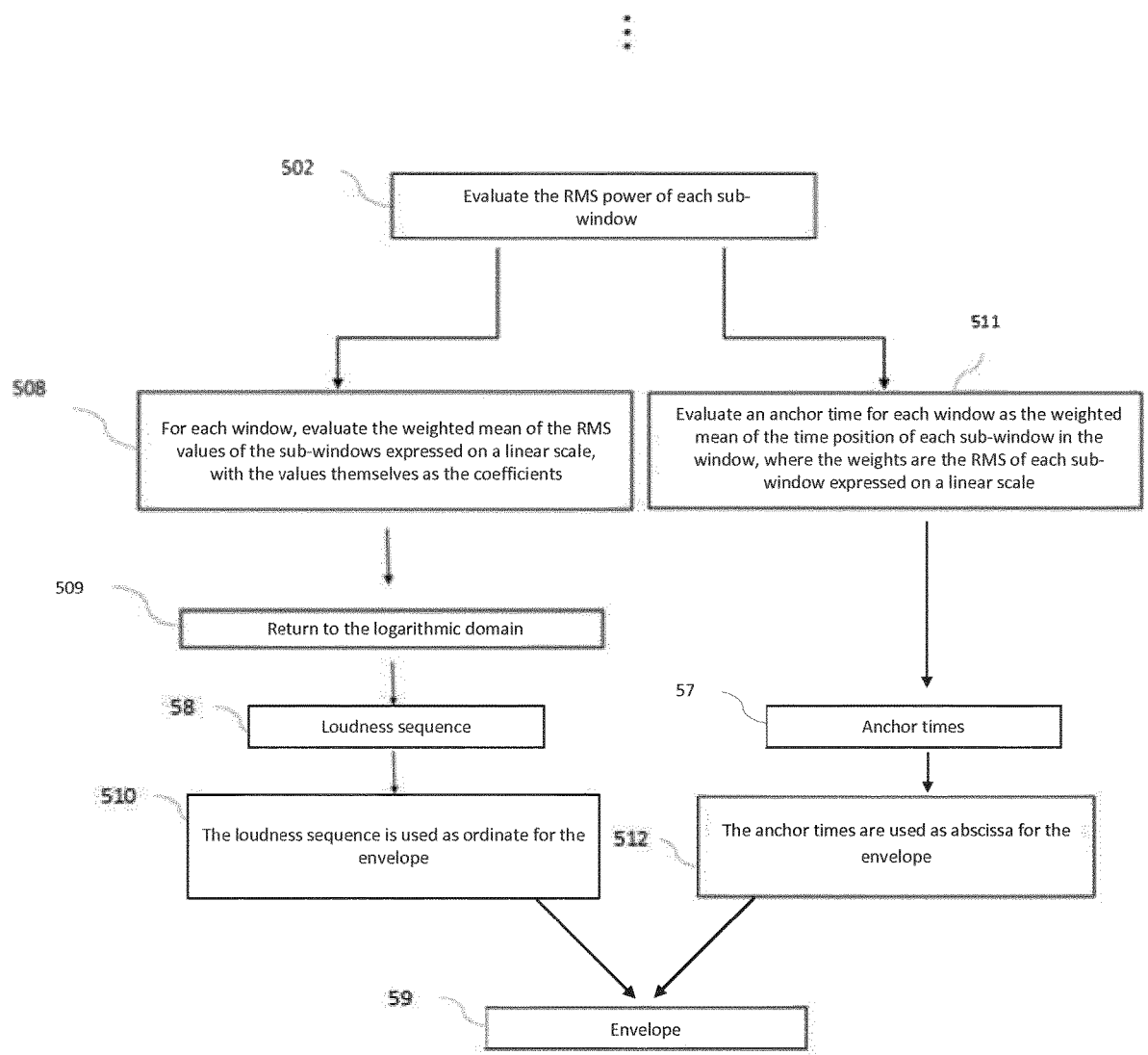
FIG. 16 schematically describes a further implementation of the double-windowing process that includes the evaluation of the weighted mean of the loudness of the sub-windows, using the loudness values themselves as the coefficients, and an evaluation of anchor times.

FIGS. 13, 15, and 16 described below in more detail schematically describe three additional embodiments of implementations of a double-windowing process to evaluate the envelope (windowed level) of input audio. These additional embodiments are based on the embodiments of FIGS. 5, 7 and, respectively 8. In these additional embodiments, an anchor time is evaluated for each window. The anchor time specifies the timing of the respective window. In a first and second possible implementation (FIGS. 13 and 15), the anchor time is evaluated as the mean position of the remaining sub-windows. In a third implementation (FIG. 16), the anchor time is evaluated as the weighted mean position of the sub-windows, with the weights being the loudness of the sub-windows, expressed on a linear scale.

In all three implementations, the output signal loudness is a curve whose abscissa is the series of anchor time values, and whose ordinate is the series of measured loudness.

FIG. 13 schematically describes an implementation of the double-windowing process that includes the discarding of low-loudness sub-windows, followed by the concatenation of the remaining audio and the evaluation of the RMS power of the remaining audio and an evaluation of anchor times.

Steps 500, 501, 502, and 503 of this embodiment are identical to the embodiment of FIG. 5, so that a description is omitted. These steps 500, 501, 502, and 503 result in a sequence 54 of windows containing a subset of the sub-windows in 52, where the sub-windows for which the RMS power is inferior to a manually set threshold 53 have been discarded.

At 504, the sub-windows from each window are concatenated into audio windows 56 that contain only audio from sub-windows whose RMS power is greater than the threshold 53.

At 505, the RMS power 58 (loudness) over the audio in each window 56, noted $\vec{L}[n]$, is evaluated. Each element $\vec{L}[n]$ of the envelope $\vec{L}$ is defined as the RMS power of each $\vec{W}_{partial}(n)$.

At 506, an anchor time 57 is evaluated for each $n^{th}$ window 54. The anchor time 57 is the mean position of the remaining sub-windows inside the respective window. It is noted $\vec{t}(n)$. This anchor time 57 is evaluated as follows. First, an anchor time $\tau(n, \iota)$ for each sub-window $\omega(n, \iota)$ is defined as being the middle position of the samples in each $\omega(n, \iota)$. The anchor time $\vec{t}(n)$ is defined as the mean of the anchor times of the sub-windows remaining in $\vec{W}_{partial}(n)$. If all sub-windows are discarded, then the anchor time $\vec{t}(n)$ is defined as the middle position of the window $\vec{W}(n)$.

At 510 and 512, the output envelope is defined as the loudness sequence, i.e. values $\vec{L}[n]$, set at respective times $\vec{t}(n)$. The loudness values $\vec{L}[n]$ (58) constitute the abscissa of the output envelope 59, and the anchor times $\vec{t}(n)$ (57) constitute the ordinate of the output envelope (59).

Figure 14:
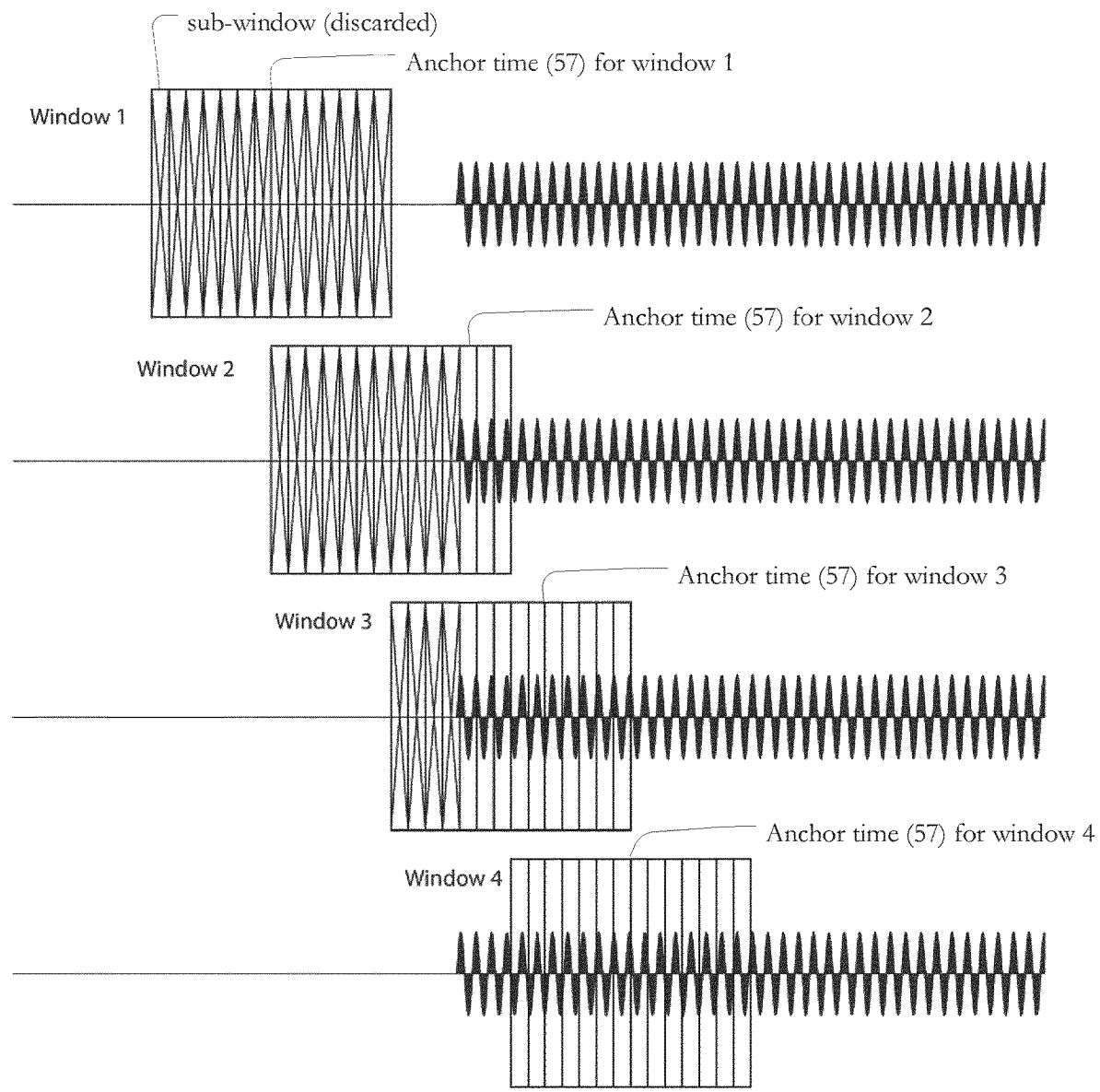
FIG. 14 illustrates the implementation according to FIG. 13 on a sequence in which a full-scale sine wave follows background noise.

FIG. 14 illustrates the implementation according to FIG. 13 on a sequence in which a full-scale sine wave follows background noise. Four exemplifying anchor times for Window 1, Window 2, Window 3, and Window 4 are displayed in FIG. 14. The anchor times 57 are the mean of the positions of the sub-windows as described with regard to FIG. 13 above. In the case of window 1, all sub-windows are discarded. As a result, the anchor time is defined as the middle position of the window.

FIG. 15 schematically describes an implementation of the double-windowing process that includes the discarding of low-loudness sub-windows, followed by the evaluation of the mean RMS power of remaining sub-windows and an evaluation of anchor times.

Steps 500, 501, 502, and 503 of this embodiment are identical to the embodiment of FIG. 7, so that a description is omitted. These steps 500, 501, 502, and 503 result in a sequence 54 of windows containing a subset of the sub-windows in 52, where the sub-windows for which the RMS power is inferior to a manually set threshold 53 have been discarded.

At 506, the RMS power values are expressed on a linear scale, and for each window, the mean of the RMS power values of the remaining sub-windows are evaluated.

Let $\chi[n, \iota]$ be the RMS power of the sub-window $\omega(n, \iota)$, expressed on a linear scale. The ordinate for the envelope, denoted as $\vec{L}[n]$, is evaluated for each n as $\vec{L}[n]=\overline{\chi[n,\iota]}$, $\iota$ being the index of the sub-windows remaining after 503.

At 507, the loudness sequence $\vec{L}[n]$ (58) is expressed in the logarithmic domain, with $\vec{L}[n]$ being set to $20 \times \log_{10}(\vec{L}[n])$.

At 511, an anchor time (57) for each $n^{th}$ window (51) is evaluated in a similar way as in the embodiment of FIG. 13 as the mean position of the remaining sub-windows. The anchor times are again denoted as $\vec{t}(n)$. These anchor times $\vec{t}(n)$ (57) are evaluated as follows: First, an anchor time $\tau(n, \iota)$ for each sub-window $\omega(n, \iota)$ is defined as being the middle position of the samples in each $\omega(n, \iota)$. The anchor time $\vec{t}(n)$ is defined as the mean of the anchor times of the sub-windows remaining in $\vec{W}_{partial}(n)$. If all sub-windows are discarded, then the anchor time $\vec{t}(n)$ is defined as the middle position of the window $\vec{W}(n)$.

At 510 and 512, the output envelope is defined as the values $\vec{L}[n]$ set at times $\vec{t}(n)$. $\vec{L}[n]$ (58) is the abscissa of the output envelope 59, $\vec{t}(n)$ (57) is the ordinate of the output envelope 59.

FIG. 16 schematically describes a further possible implementation of the double-windowing process that includes the evaluation of the weighted mean of the loudness of the sub-windows, using the loudness values themselves as the coefficients, and an evaluation of anchor times. Steps 500, 501, and 502 of this embodiment are identical to the embodiment of FIG. 8. At 502, the RMS power of the content of each sub-window is evaluated.

At 508, each value of the envelope is evaluated as the weighted mean of the RMS values of the sub-windows in the window $\vec{A}(n)$, with the RMS values being themselves the coefficients.

Let $\chi[n, \iota]$ be the RMS power of the sub-window $\omega(n, \iota)$, expressed on a linear scale.

For each n, $\vec{L}[n]$ is set to $$\frac{\sum_{l} \chi[n, l]^2}{\sum_{l} \chi[n, l]}.$$

At 509, $\vec{L}[n]$ (58) is expressed in the logarithmic domain, with $\vec{L}[n]$ being set to $20 \times \log_{10}(\vec{L}[n])$.

At 511, an anchor time 57 for each $n^{th}$ window (51) is evaluated as a weighting position of the sub-windows. As in the embodiments of FIGS. 13 and 15, the anchor times are denoted as $\vec{t}(n)$. The anchor times $\vec{t}(n)$ (57) are evaluated as follows: First, an anchor time $\tau(n, \iota)$ for each sub-window $\omega(n, \iota)$ is defined as being the middle position of the samples in each $\omega(n, \iota)$. The anchor time $\vec{t}(n)$ is defined as the weighted mean of the anchor times of the sub-windows, where the weights are the RMS of each sub-window. Formally, $$\vec{t}(n) = \frac{\sum_{l} \chi[n, l] \circ \tau(n, l)}{\sum_{l} \chi[n, l]},$$

where "∘" is the term-by-term or Hadamard product. If the RMS of all sub-windows is zero, i.e. if for a given n, $\Sigma_{\iota}\chi[n, \iota]=0$, then the anchor time $\vec{t}(n)$ is defined as the middle position of the window $\vec{W}(n)$.

At 510 and 512, the output envelope is defined as the values $\vec{L}[n]$ set at times $\vec{t}(n)$. The loudness values $\vec{L}[n]$ (58) constitute the abscissa of the output envelope 59, the anchor times $\vec{t}(n)$ (57) constitute the ordinate of the output envelope 59.

Figure 17:
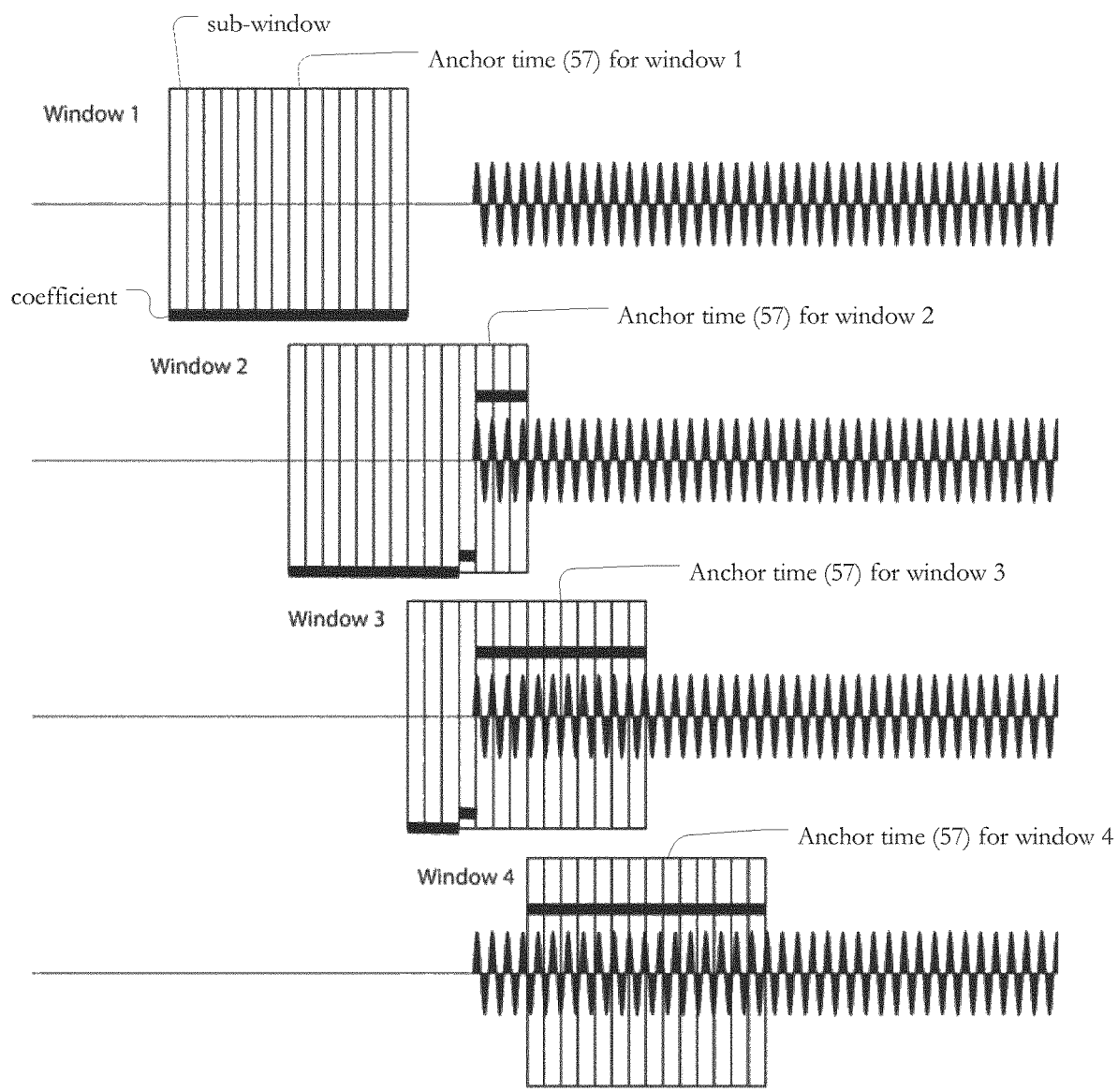
FIG. 17 illustrates the implementation of FIG. 16 on a sequence in which a full-scale sine wave follows background noise.

FIG. 17 illustrates the implementation of FIG. 16 on a sequence in which a full-scale sine wave follows background noise. Each anchor time 57 is the mean of the positions of the sub-windows. In the case of window 1, as the RMS of all sub-windows is zero, the anchor time is defined as the middle position of the window.

Figure 18:
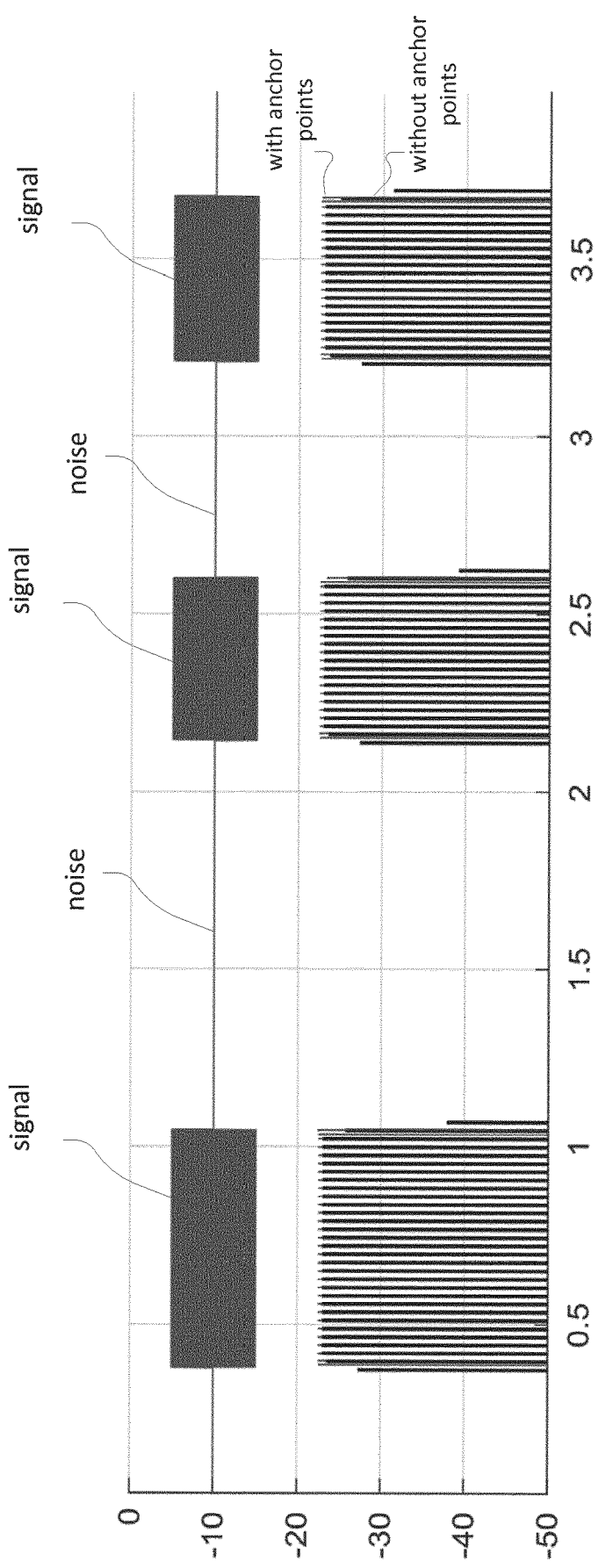
FIG. 18 shows the positions and values of the loudness measured with double-windowing, positioned at the anchor points as described with regard to the embodiments of FIGS. 13, 15, and 16 in comparison to the positions and values of the loudness measured using the embodiments of FIGS. 5, 7 and, respectively 8.

FIG. 18 shows the positions and values of the loudness measured with double-windowing, positioned at the anchor times as described with regard to the embodiments of FIGS. 13, 15, and 16 in comparison to the positions and values of the loudness measured using the embodiments of FIGS. 5, 7 and, respectively 8 (in black). The thin lines represent measures of loudness using double-windowing and anchor points as described in FIGS. 13, 15, and 16, whereas the thick lines represent measures of loudness using windowing as described in FIGS. 5, 7 and, respectively 8. The rectangles above the measurements represent the waveform that was measured (signal and noise). As can be seen from FIG. 18, the loudness measurements are more precise in the case of the embodiment using the anchor times.

Envelope Follower with Conformation to a Common Timeline

Figure 19:
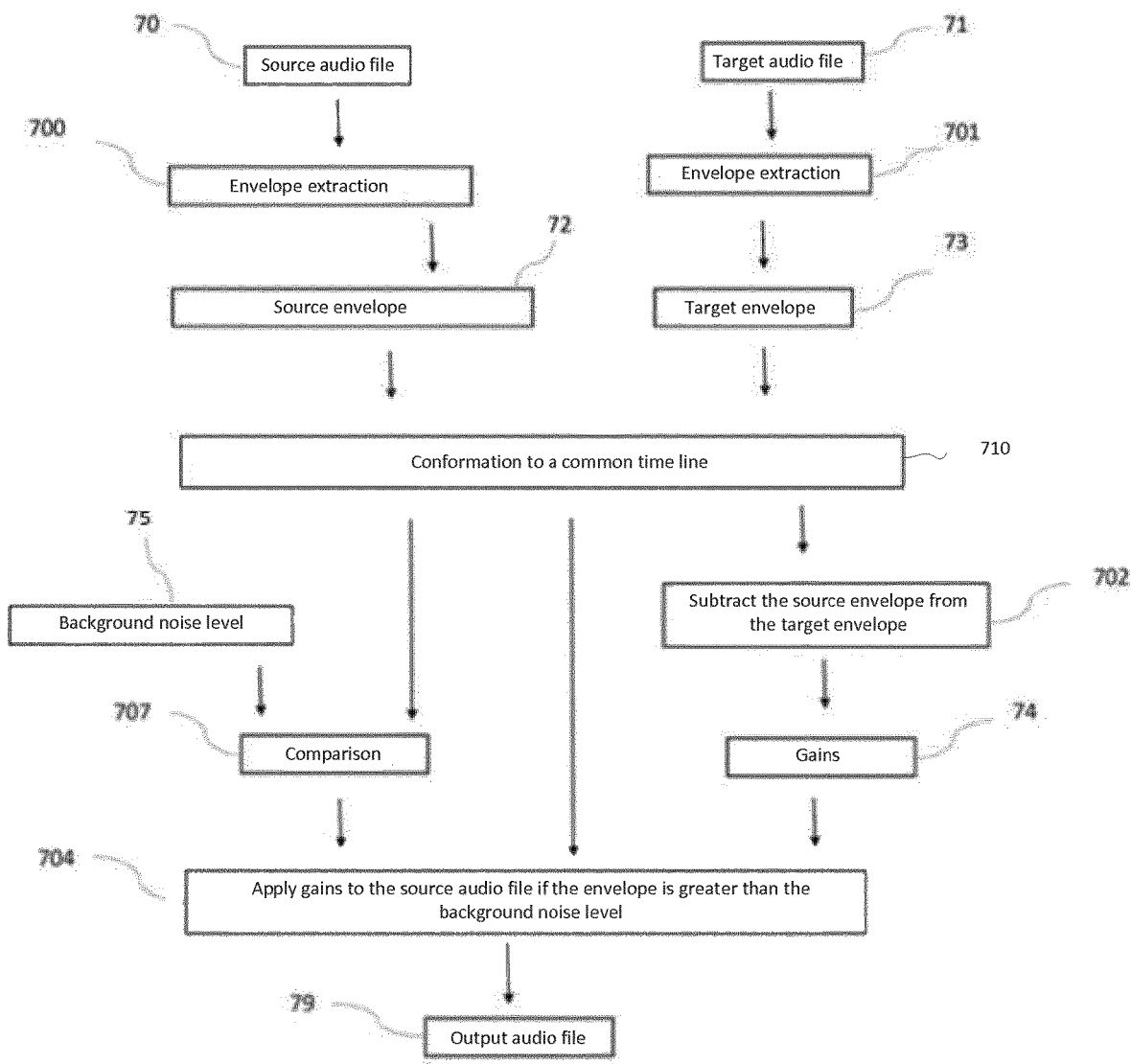
FIG. 19 schematically describes a further example application of envelope evaluation of audio files, in the form of an envelope follower.

FIG. 19 schematically describes a further example application of envelope evaluation of audio files, in the form of an envelope follower. The embodiment substantially corresponds to the embodiment of FIG. 10, so that it is referred to the description of FIG. 10 for a general explanation of the envelope follower. The embodiment of FIG. 19 differs from the embodiment of FIG. 10 in that a process 710 is added in which the source envelope 72 and the target envelope 73 are conformed to a common timeline. A possible process to realize operation 710 involves interpolation.

Implementation

In the following, an embodiment of an electronic device 130 is described under reference of FIG. 20. The electronic device, here a computer 930, can be implemented such that it can basically function as any type of audio processing apparatus or audio processing entity described herein. The computer has components 931 to 940, which can form a circuitry, such as any one of the circuitries of an audio processing device.

Embodiments which use software, firmware, programs, plugins or the like for performing the processes as described herein can be installed on computer 930, which is then configured to be suitable for the embodiment.

The computer 930 has a CPU 931 (Central Processing Unit), which can execute various types of procedures and methods as described herein, for example, in accordance with programs stored in a read-only memory (ROM) 932, stored in a storage 937 and loaded into a random access memory (RAM) 933, stored on a medium 940, which can be inserted in a respective drive 939, etc.

The CPU 931, the ROM 932 and the RAM 933 are connected with a bus 941, which in turn is connected to an input/output interface 934. The number of CPUs, memories and storages is only exemplary, and the skilled person will appreciate that the computer 930 can be adapted and configured accordingly for meeting specific requirements which arise when it functions as a base station, and user equipment.

At the input/output interface 934, several components are connected: an input 935, an output 936, the storage 937, a communication interface 938 and the drive 939, into which a medium 940 (compact disc, digital video disc, compact flash memory, or the like) can be inserted.

The input 935 can be a pointer device (mouse, graphic table, or the like), a keyboard, a microphone, a camera, a touchscreen, etc.

The output 936 can have a display (liquid crystal display, cathode ray tube display, light emittance diode display, etc.), loudspeakers, etc.

The storage 937 can have a hard disk, a solid state drive and the like.

The communication interface 938 can be adapted to communicate, for example, via a local area network (LAN), wireless local area network (WLAN), mobile telecommunications system (GSM, UMTS, LTE, etc.), Bluetooth, infrared, etc.

It should be noted that the description above only pertains to an example configuration of computer 930. Alternative configurations may be implemented with additional or other sensors, storage devices, interfaces or the like. For example, the communication interface 938 may support other radio access technologies than the mentioned WLAN, GSM, UMTS and LTE.

The methods as described herein are also implemented in some embodiments as a computer program causing a computer and/or a processor and/or a circuitry to perform the method, when being carried out on the computer and/or processor and/or circuitry. In some embodiments, also a non-transitory computer-readable recording medium is provided that stores therein a computer program product, which, when executed by a processor/circuitry, such as the processor/circuitry described above, causes the methods described herein to be performed.

It should be recognized that the embodiments describe methods with an exemplary ordering of method steps. The specific ordering of method steps is, however, given for illustrative purposes only and should not be construed as binding.

Figure 20:
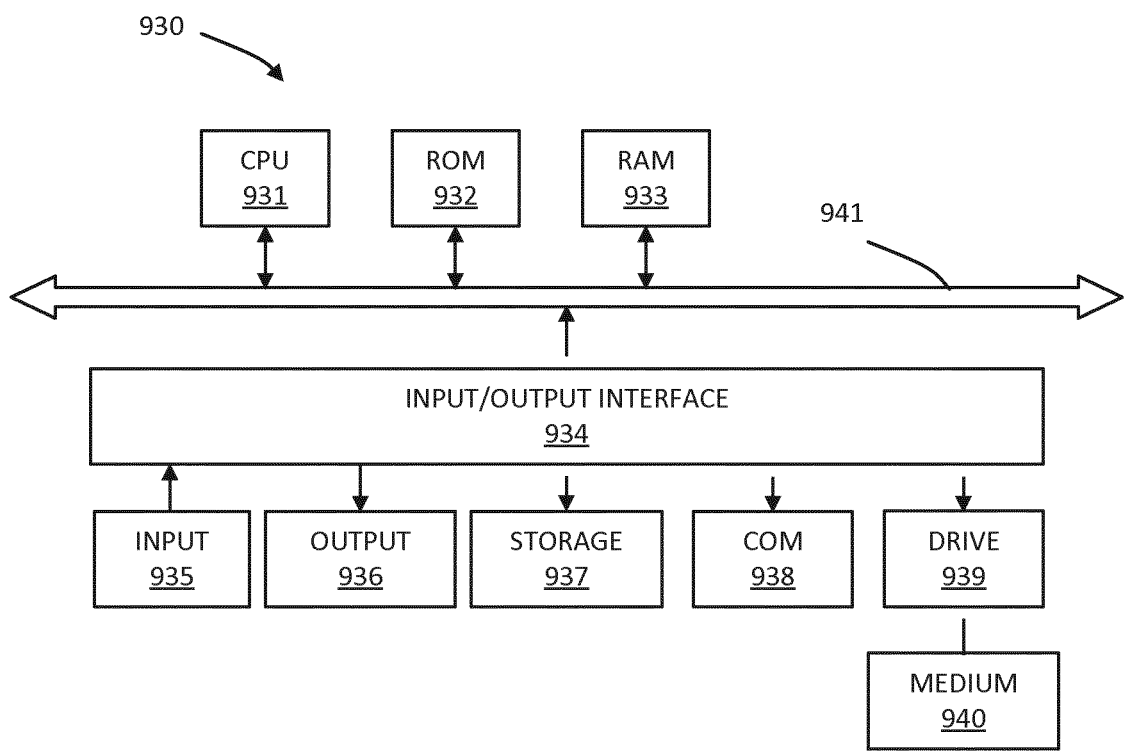
FIG. 20 schematically describes an embodiment of an electronic device for implementing the processes.

It should also be noted that the division of the control or circuitry of FIG. 20 into units 931 to 940 is only made for illustration purposes and that the present disclosure is not limited to any specific division of functions in specific units. For instance, at least parts of the circuitry could be implemented by a respective programmed processor, field programmable gate array (FPGA), dedicated circuits, and the like.

All units and entities described in this specification and claimed in the appended claims can, if not stated otherwise, be implemented as integrated circuit logic, for example on a chip, and functionality provided by such units and entities can, if not stated otherwise, be implemented by software.

In so far as the embodiments of the disclosure described above are implemented, at least in part, using software-controlled data processing apparatus, it will be appreciated that a computer program providing such software control and a transmission, storage or other medium by which such a computer program is provided are envisaged as aspects of the present disclosure.

Note that the present technology can also be configured as described below:

(1) A method comprising determining an envelope (59, 63, 64) of an audio file (50) based on a double-windowing analysis (603) of the audio file.

(2) The method of (1), wherein the double-windowing analysis (603) comprises windowing (500) the source audio file to obtain a sequence of windows (51) containing audio, and windowing (501) each window of the sequence of windows (51) to obtain, for each window (51), a respective sequence of sub-windows (52).

(3) The method of (2), wherein determining the envelope (59, 63, 64) from the sequence of windows (51) comprises discarding sub-windows (52) whose loudness is below a threshold (53) and evaluating the loudness of each window (51) over the remaining audio.

(4) The method of (2), wherein determining the envelope (56) from the sequence of windows (51) comprises determining, for each window, the weighted mean of the loudness of the sub-windows (52) in each window (51), where the coefficients are the loudness values of the sub-windows (52).

(5) The method of anyone of (1) to (4), further comprising determining a loudness curve (59) from the source audio file (31).

(6) The method of anyone of (1) to (5), wherein the method is applied in an envelope evaluation framework.

(7) The method of anyone of (1) to (6), wherein the method is applied in an envelope follower framework.

(8) The method of anyone of (1) to (7), wherein the method is applied in an automatic audio mixing framework.

(9) The method of anyone of (1) to (7), further comprising determining anchor times (57) for each window, and determine an output envelope (91) as a sequence of loudness values (58) set at respective anchor times (57).

(10) The method of (9) in which an anchor time (57) is evaluated as the mean position of sub-windows.

(11) The method of (9) in which an anchor time (57) is evaluated as a weighted mean position of sub-windows, with the weights being the loudness of the sub-windows, expressed on a linear scale.

(12) An electronic device comprising circuitry configured to determine an envelope (59, 63, 64) of an audio file (50) based on a double-windowing analysis (603) of the audio file.

(13) A computer program comprising instructions, which when executed on a processor cause the processor to determine an envelope of an audio file based on a double-windowing analysis of the audio file.

(14) A computer-readable medium storing instructions, which when executed on a processor cause the processor to determine an envelope of an audio file based on a double-windowing analysis of the audio file.

(15) An electronic device comprising circuitry configured to perform the method of anyone of (1) to (11).

(16) A computer program comprising instructions, which when executed on a processor cause the processor to perform the method of anyone of (1) to (11).

(17) A computer-readable medium storing instructions, which when executed on a processor cause the processor to perform the method of anyone of (1) to (11).

REFERENCES

[EBU 2011] EBU-TECH 3341, "Loudness metering: 'EBU mode' metering to supplement loudness normalisation in accordance with EBU R 128.", EBU/UER, August 2011.

The invention claimed is:
1. A method comprising:
   determining, by circuitry of an electronic device, an envelope of an audio file based on a double-windowing analysis of the audio file, wherein
   the double-windowing analysis comprises windowing, by the circuitry, the audio file to obtain a sequence of windows containing audio, and windowing, by the circuitry, each window of the sequence of windows to obtain, for each window, a respective sequence of sub-windows, and
   determining the envelope from the sequence of windows comprises discarding sub-windows whose loudness is below a threshold and evaluating the loudness of each window over the remaining audio.

2. The method of claim 1, wherein
   determining the envelope from the sequence of windows comprises determining, for each window, a weighted mean of loudness of the sub-windows in each window, where coefficients are loudness values of the sub-windows.

3. The method of claim 1, further comprising:
   determining a loudness curve from the audio file.

4. The method of claim 1, wherein the method is applied in an envelope evaluation framework.

5. The method of claim 1, wherein the method is applied in an envelope follower framework.

6. The method of claim 1, wherein the method is applied in an automatic audio mixing framework.

7. The method of claim 1, further comprising:
   determining anchor times for each window, and determine an output envelope as a sequence of loudness values set at respective anchor times.

8. The method of claim 7, in which an anchor time is evaluated as mean position of sub-windows.

9. The method of claim 7, in which an anchor time is evaluated as a weighted mean position of sub-windows, with the weights being the loudness of the sub-windows, expressed on a linear scale.

10. An electronic device comprising:
    circuitry configured to determine an envelope of an audio file based on a double-windowing analysis of the audio file, wherein
    the double-windowing analysis comprises windowing the audio file to obtain a sequence of windows containing audio, and windowing each window of the sequence of windows to obtain, for each window, a respective sequence of sub-windows, and
    determining the envelope from the sequence of windows comprises discarding sub-windows whose loudness is below a threshold and evaluating the loudness of each window over the remaining audio.

11. A non-transitory computer-readable medium including a computer program comprising instructions, which when executed on a processor cause the processor to:
    determine an envelope of an audio file based on a double-windowing analysis of the audio file, wherein
    the double-windowing analysis comprises windowing the audio file to obtain a sequence of windows containing audio, and windowing each window of the sequence of windows to obtain, for each window, a respective sequence of sub-windows, and
    determining the envelope from the sequence of windows comprises discarding sub-windows whose loudness is below a threshold and evaluating the loudness of each window over the remaining audio.

12. The electronic device of claim 10, wherein
    determining the envelope from the sequence of windows comprises determining, for each window, a weighted mean of loudness of the sub-windows in each window, where coefficients are loudness values of the sub-windows.

13. The electronic device of claim 10, wherein the circuitry is configured to determine a loudness curve from the audio file.

* * * * *